US 6,669,234 B2

(12) United States Patent
Kohlndorfer et al.

(10) Patent No.: US 6,669,234 B2
(45) Date of Patent: Dec. 30, 2003

(54) SEAT BELT BUCKLE AND TONGUE PRESENTER SYSTEM

(75) Inventors: Kenneth H. Kohlndorfer, Roseville, MI (US); Mark F. Gray, Sterling Heights, MI (US); Markell Seitzman, Orchard Lake, MI (US); Mohannad F. Murad, Troy, MI (US); Hossam Almasri, Sterling Heights, MI (US); Randal Gosk, Troy, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/304,602

(22) Filed: Nov. 26, 2002

(65) Prior Publication Data

US 2003/0075914 A1 Apr. 24, 2003

Related U.S. Application Data

(62) Division of application No. 09/632,073, filed on Aug. 4, 2000, now Pat. No. 6,485,058.

(51) Int. Cl.$^7$ ............................................. B60R 22/03
(52) U.S. Cl. ................. 280/801.1; 280/806; 280/808; 180/268; 180/269; 180/270; 297/469; 297/481
(58) Field of Search ................. 297/469, 481; 280/801.1, 802, 806, 808; 180/268, 269, 270

(56) References Cited

U.S. PATENT DOCUMENTS

| | | | | |
|---|---|---|---|---|
| 3,343,623 A | * | 9/1967 | Porter | 280/802 |
| 3,613,819 A | * | 10/1971 | Maloney | 180/270 |
| 3,653,714 A | * | 4/1972 | Gentile | 297/469 |
| 3,781,061 A | | 12/1973 | Walz et al. | |
| 3,794,135 A | * | 2/1974 | Ewert et al. | 280/802 |
| 3,897,082 A | * | 7/1975 | Takada et al. | 280/802 |
| 3,907,059 A | * | 9/1975 | Takada et al. | 280/802 |
| 4,763,924 A | | 8/1988 | Karlin et al. | |
| 4,993,748 A | | 2/1991 | Jambor et al. | |
| 5,236,220 A | | 8/1993 | Mills | |
| 5,431,446 A | | 7/1995 | Czarnecki et al. | |
| 5,639,120 A | | 6/1997 | Kmiec et al. | |
| 5,667,246 A | | 9/1997 | Miller, III | |
| 5,709,408 A | * | 1/1998 | Carraway, Jr. | 280/804 |
| 5,871,236 A | * | 2/1999 | Bauer et al. | 280/806 |
| 5,887,897 A | | 3/1999 | Gill et al. | |
| 5,934,759 A | | 8/1999 | Paschek et al. | |
| 6,293,588 B1 | * | 9/2001 | Clune | 280/808 |
| 6,308,986 B1 | | 10/2001 | Townsend et al. | |
| 2002/0043872 A1 | * | 4/2002 | Townsend et al. | 297/473 |
| 2002/0109392 A1 | | 8/2002 | Petri et al. | |

FOREIGN PATENT DOCUMENTS

| | | |
|---|---|---|
| EP | 0 323 877 A2 | 7/1989 |
| GB | 2 126 077 A * | 3/1984 |
| JP | 362071739 A | 4/1987 |
| JP | 362247942 A | 10/1987 |
| JP | 406286576 A | 10/1994 |
| JP | 6286576 | 11/1994 |
| JP | 410194081 A | 7/1998 |

OTHER PUBLICATIONS

Machine Language Translation from http://www4.updl.jpo.go.jp/ of JP 06–286576 A.*

* cited by examiner

*Primary Examiner*—Paul N. Dickson
*Assistant Examiner*—Ruth Ilan
(74) *Attorney, Agent, or Firm*—Markell Seitzman

(57) ABSTRACT

A system (20) comprising a buckle presenter (100) and/or a tongue presenter (200) and mechanism to activate and control each presenter. The buckle presenter and tongue presenter (200) are used to respectively move a seat belt buckle (26) and a corresponding tongue (24) from a stowed position to activated positions generally in front of the occupant to make the process of inserting the tongue into the buckle more convenient.

15 Claims, 20 Drawing Sheets

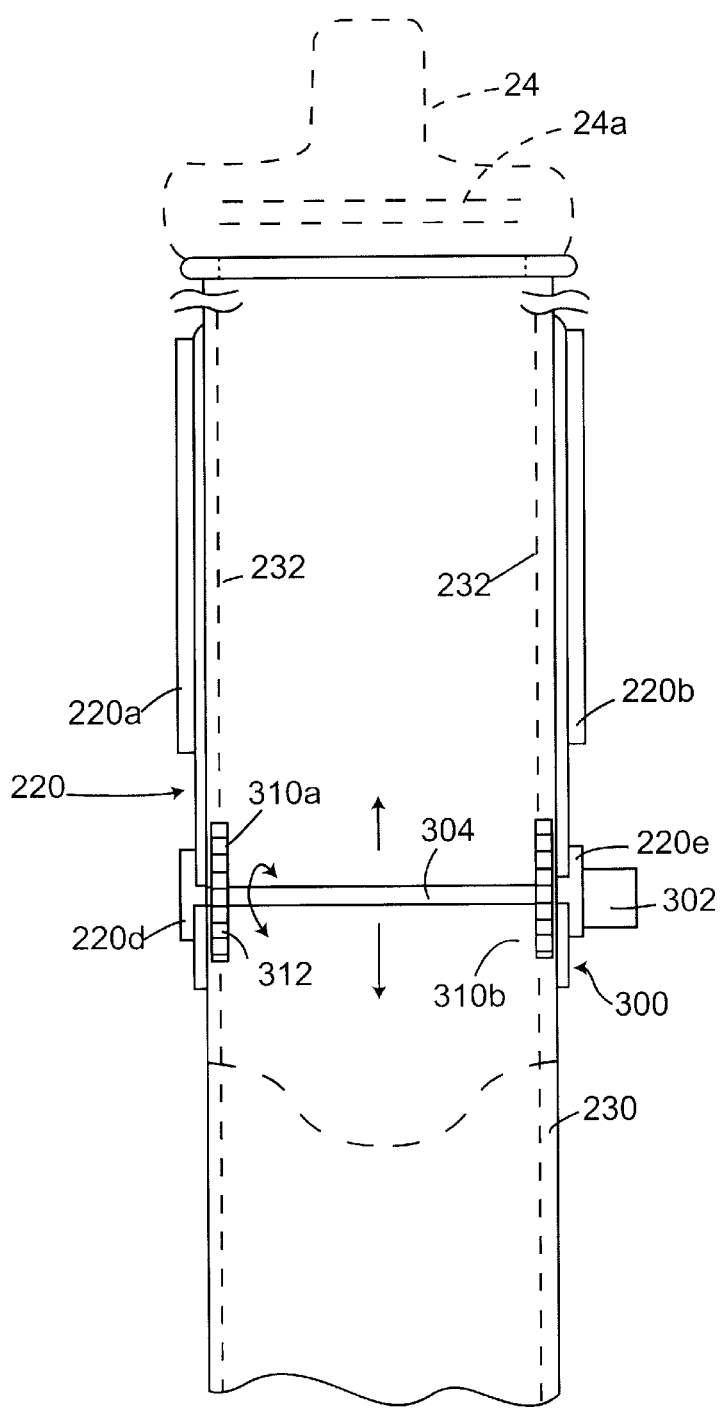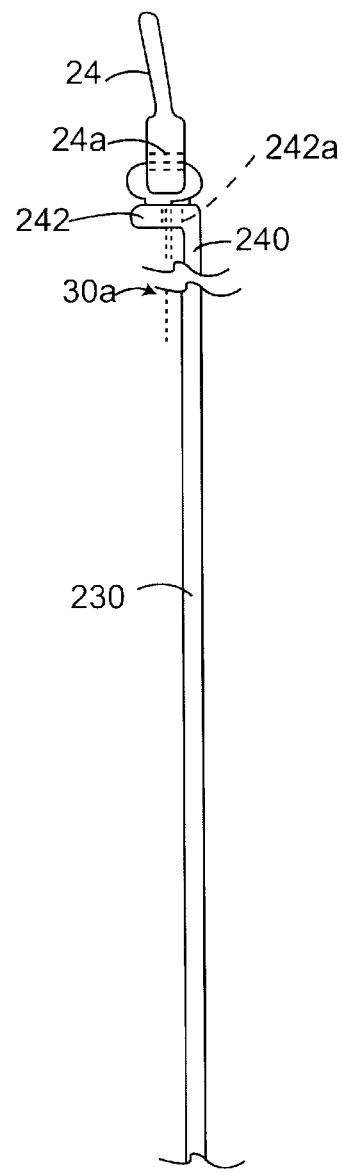
Fig. 7
Fig. 8

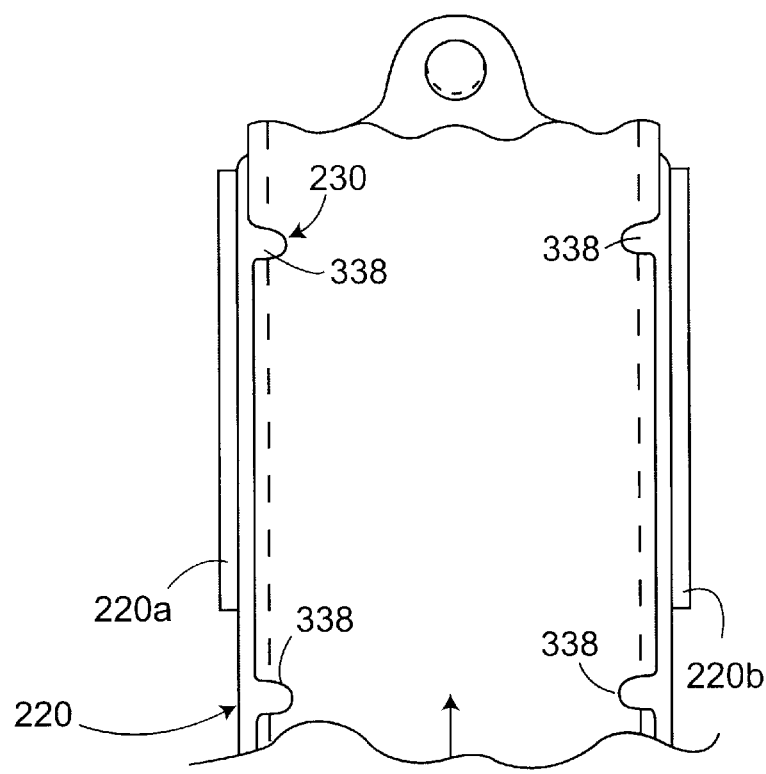
Fig. 9
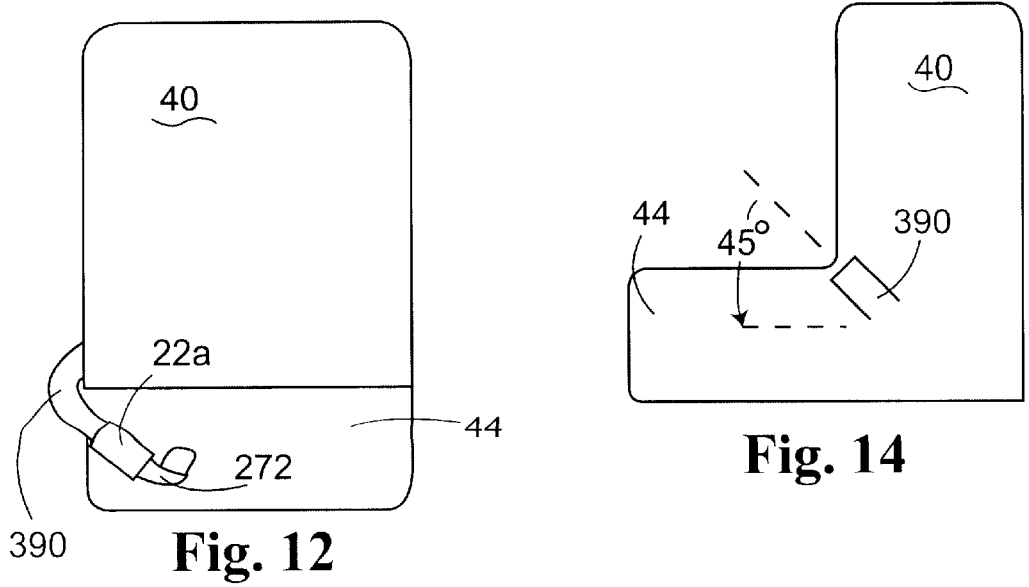
Fig. 12
Fig. 14

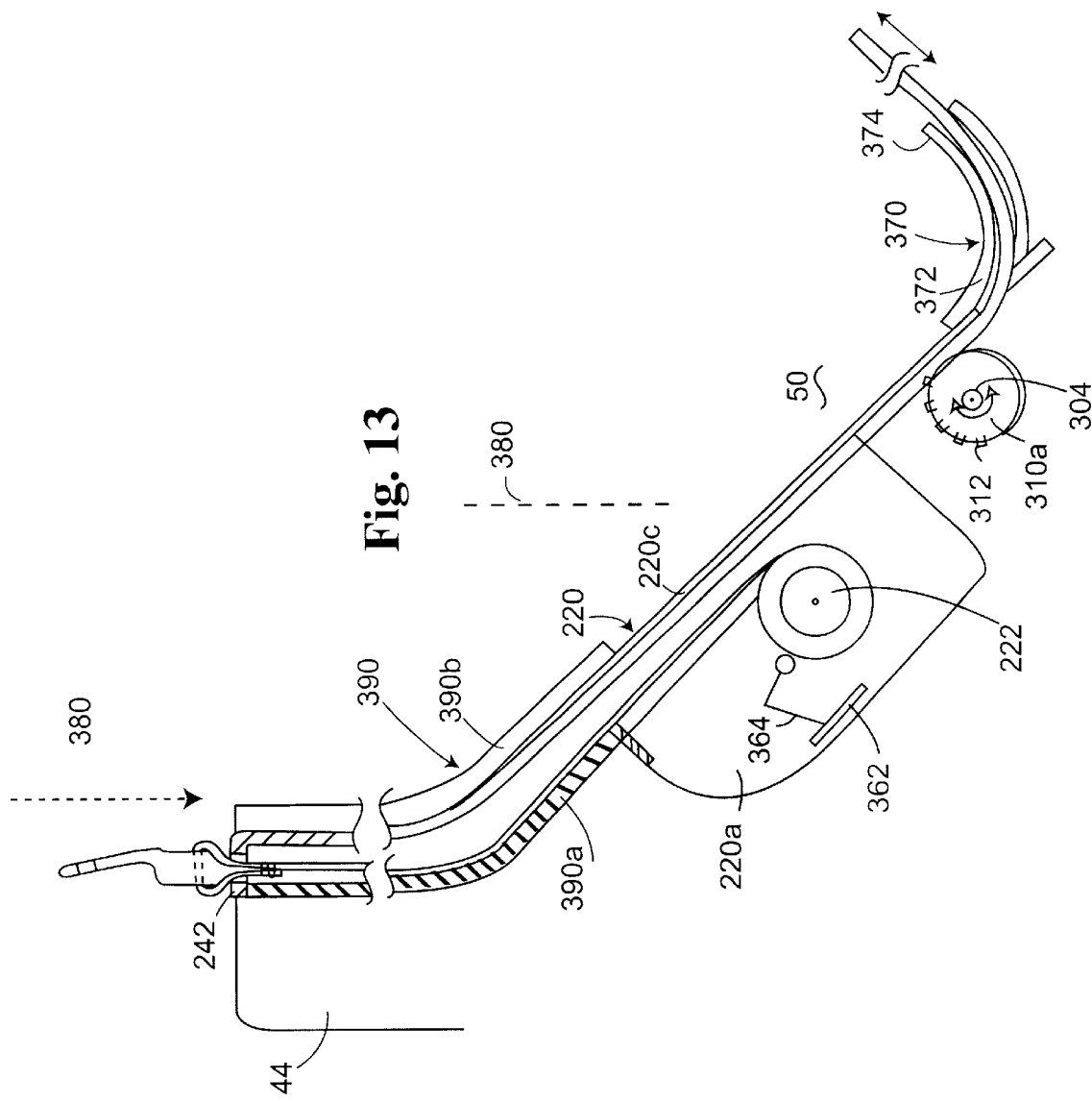
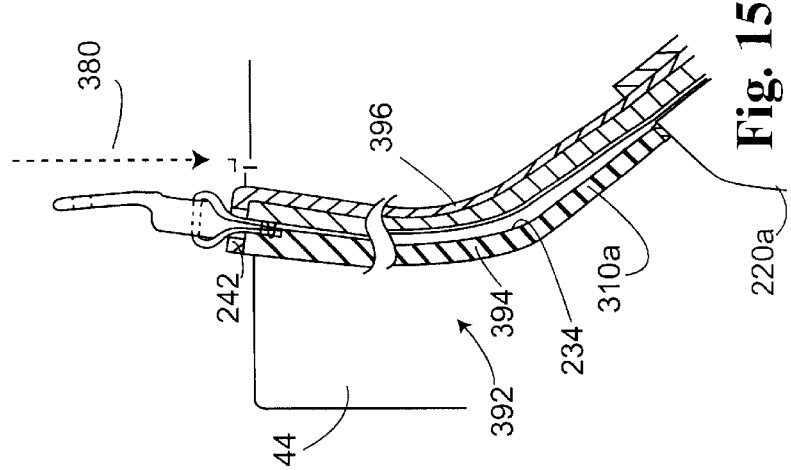

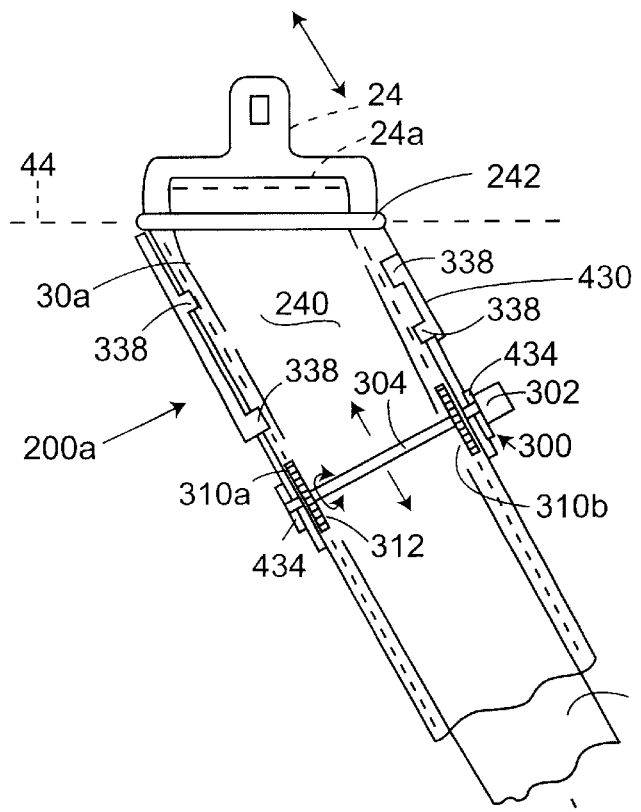
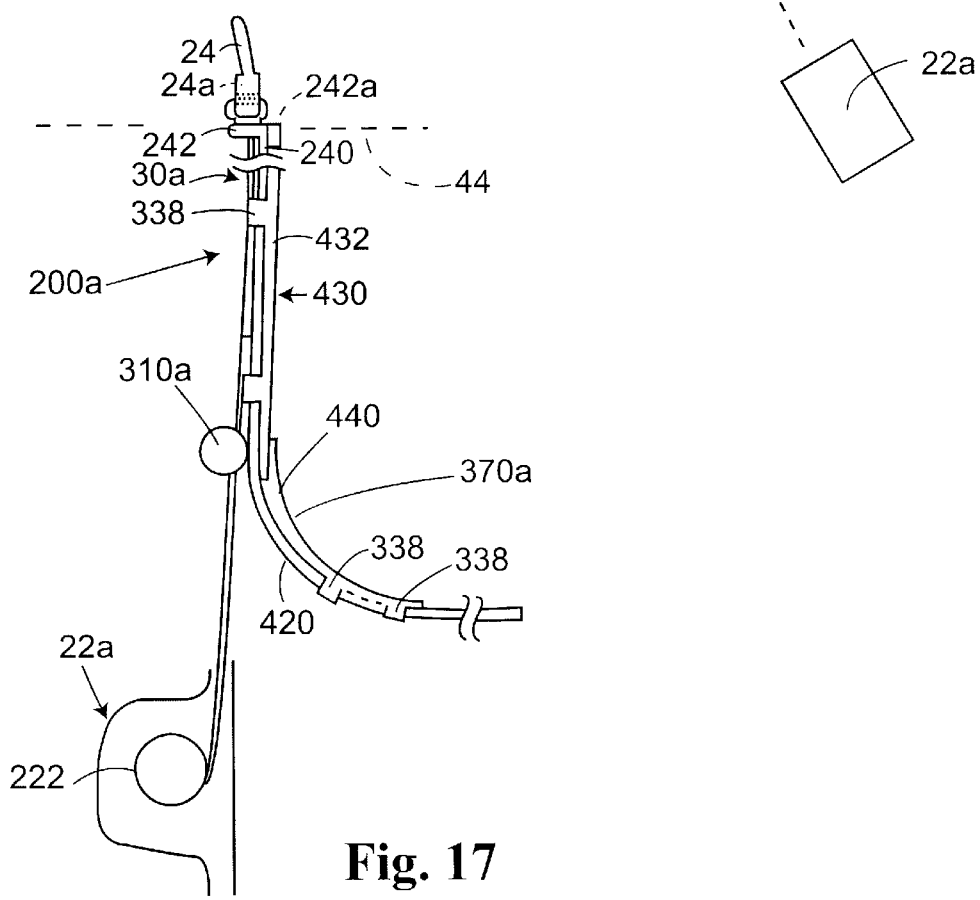
Fig. 16
Fig. 17

US 6,669,234 B2

SEAT BELT BUCKLE AND TONGUE PRESENTER SYSTEM

This application is a division of application Ser. No. 09/632,073 filed on Aug. 4, 2000 now U.S. Pat. No. 6,485,058.

BACKGROUND AND SUMMARY OF THE INVENTION

The present invention generally relates to a mechanism that can move the buckle and/or a tongue to a more convenient location relative to the seat and seated occupant so that it is easier for such occupant to insert a tongue within the buckle.

It is an object of the present invention to provide a mechanism that can move a seat belt buckle and/or a seat belt tongue to a convenient location to facilitate the attachment of a tongue thereto and to then move the buckle and tongue to an operative position to protect the occupant during an accident.

Accordingly the invention comprises one or both of a seat belt buckle presenting system and/or a seat belt tongue presenting system. The seat belt buckle presenting system comprises: a seat belt buckle operatively movable about a pivot point, the buckle movable between a first position and a second position. In the first position the buckle is located in a position to protect the occupant during an emergency and in the second position the buckle is located forward and higher than in the first position to facilitate connection of a tongue to the buckle; and first means for moving the buckle between the first and second positions. Movement of the buckle from the second position back to the first position also entails movement of the latched tongue that is latched within the buckle. In one embodiment the buckle is connected to one end of a pivoted lever. The lever is moved by a worm gear mechanism. In another embodiment the lever is moved by a sector gear.

The tongue presenting system comprises: an extendible and retractable, semi-rigid member, which in one embodiment is incorporated within a seat belt retractor. In another embodiment, the function of the presenter is separate from the function of the retractor. The tongue is connected directly to the seat belt (also referred to as seat belt webbing or webbing). Outward movement of the tape from the retractor carries the tongue to an activated position in which it is more convenient to grasp the tongue and then insert same within the buckle. As the tongue is moved from its activated position, the tape is withdrawn and placed in a stowed position.

A control system is provided to control the movement of the buckle and tongue presenters.

Many other objects and purposes of the invention will be clear from the following detailed description of the drawings.

BRIEF DESCRIPTION OF THE DRAWINGS

In the drawings:

FIG. 7 is a view of the seat belt retractor with the spool and seat belt webbing removed showing the tongue presenting member in relation to the retractor frame.

FIG. 8 is a side view of the tongue presenting member.

FIG. 9 shows an alternate way of guiding a tape.

FIGS. 12–14 show a further embodiment of the invention.

FIG. 15 shows a further embodiment of a tape guide.

FIGS. 16 and 17 show another embodiment of the invention.

DETAILED DESCRIPTION OF THE DRAWINGS

Figure 1:
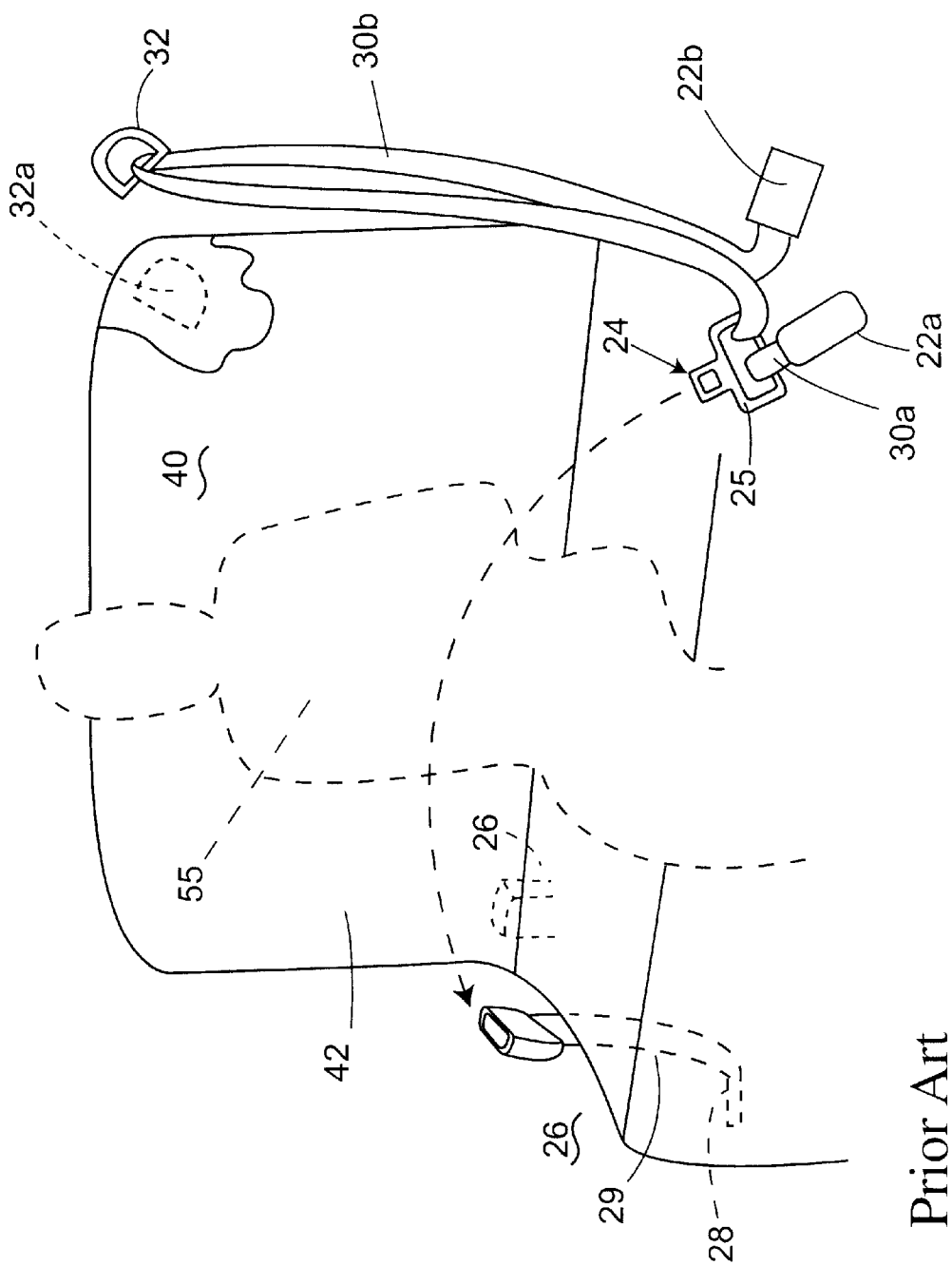
FIG. 1 shows a prior art seat belt system with two retractors.
Figure 2:
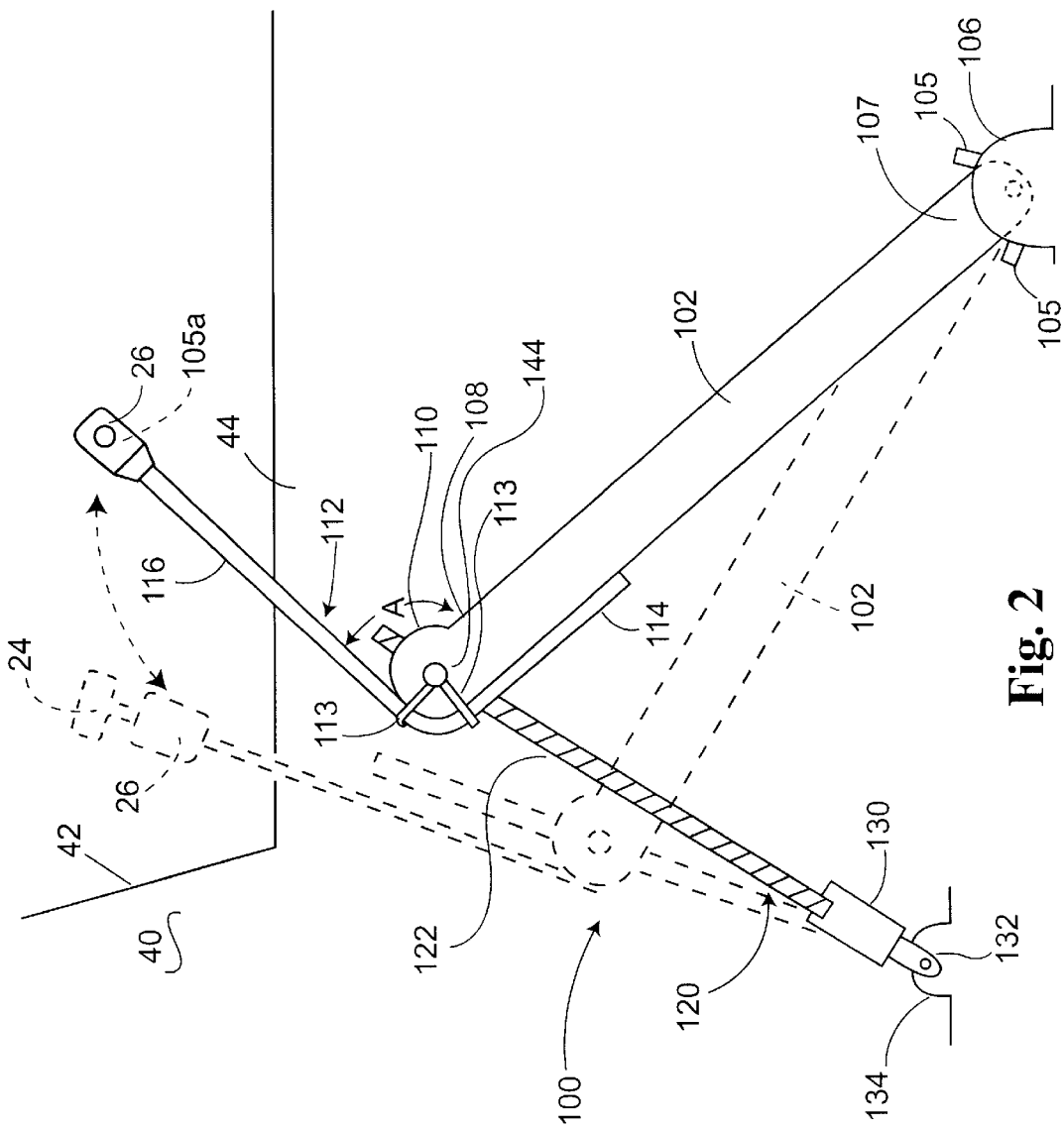
FIG. 2 shows a first embodiment of a seat belt buckle presenter.
Figure 3:
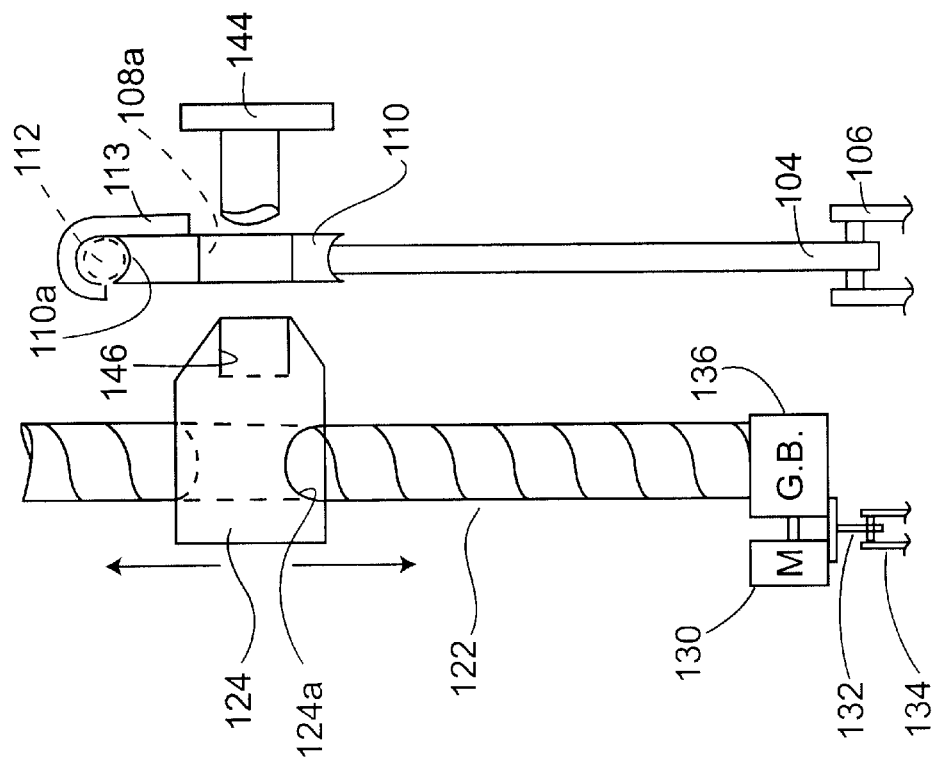
FIG. 3 shows a front view (looking toward the rear of the vehicle) of the major components of a buckle presenter.

FIG. 1 shows a typical sear belt installation or system comprising a plurality of seat belt retractors 22a and 22b. Retractor 22a is a lap retractor and includes a lap belt 30a, which is connected to a tongue 24. The second retractor 22b is a shoulder belt retractor and is connected to a shoulder belt 30b. The shoulder belt extends from the retractor through a D-ring or web guide such as 32 and is connected to the tongue 24 or, alternatively, for example sewn to the end 25 of the lap belt 30a. The web guide 32 can be external to the vehicle seat 40 or incorporated within the vehicle seat (see numeral 32a) As can be seen, the buckle is typically located adjacent the inside of the seat cushion (for bucket seats) or near or at the intersection of the seat back and seat bottom (see buckle 26 in phantom line). In either position it is somewhat inconvenient for the occupant to a) find the buckle (and/or the tongue) and b) to then insert the tongue in this buckle. In a typical seat belt system the buckle 26 is secured to an anchor 28 via a cable or length of seat belt generally shown by numeral 29. FIG. 1 also shows the tongue in its stored position, that is, after the tongue 26 has been released from the buckle 26, the lap belt retractor 22a will rewind the lap belt 30a, positioning the tongue generally close to the location of the lap belt retractor 22a. In some installations the retractor 22a is positioned on the outside of the vehicle seat while in other applications the retractor is positioned within the seat and when in a stowed position the tongue is positioned upon a portion of the seat cushion. Of course, when the tongue is no longer attached to the buckle, the shoulder belt retractor 22b will similarly retract the shoulder belt. In some installations, there is not very much room between the seat and the vehicle side, making it difficult for certain occupants to find, grasp and pull the tongue toward the buckle. FIGS. 2 and 3 illustrate features of a seat belt presenter 100 that can be used with the seat belt configurations that use a single or multiple seat belt retractors. FIG. 2 shows buckle presenter 100, as well as a portion of the seat cushion 44 and seat back 42. The seat belt buckle presenter includes a lever 102 having a first end 104 that is pivotally connected to a pivoted anchor point 106. The other end 108 of the lever may include a fixedly attached pulley wheel or segment of a pulley wheel (or pulley) 110 with a grooved edge 110a (see FIG. 3). A length of semi-rigid cable 112 curves about the underside of the pulley and one end 114 of the cable is secured to the lever 102 such as along its underside. The other end 116 of the cable is secured in a known manner to the buckle 26 (typically to the frame of the buckle) such as by welding or crimping. The cable 112 is received within a portion of the grooved edge 110a (see FIG. 3). The cable 112 is held within the pulley 110 by one or more clips 113 or brackets. The placement of the clip or clips also controls the exit angle, A, by which the cable 112 departs from the pulley wheel 110. As can be appreciated, the cable 112 can be eliminated. For example, the lever can be L-shaped and the buckle secured to the extending part of the L-shaped lever. The buckle presenter 100 further includes a control mechanism 120 that causes the selective rotation (pivoting) of the lever 102 from a stowed position (see phantom lines) to an activated position (as illustrated in FIG. 2) and in so doing, moves the buckle 26 from a stowed position (shown in phantom line), near the intersection of the seat cushion and seat back, to an activated position forward and to the side of an occupant. It should be understood chat the buckle presenter can be positioned within the seat or external to the seat (and follows the placement of the buckle). In one embodiment, the control mechanism 120 includes a worm gear mechanism comprising a worm gear 122 and a threaded nut 124 (shown in FIG. 3). The worm gear is received within a threaded bore 124a of the nut and as the worm gear turns, the nut is moved up and down the length of the worm gear. The nut is also pivotally connected to end the pulley 110, which includes an opening 108a at end 108. A fastener 144 is loosely received within the opening 110a and secured within threads 146 within the nut 124. The worm gear 122 is driven by a motor 130, either directly or indirectly, such as through a gear box. As illustrated in FIG. 2, the motor housing is directly connected to the worm gear. The motor housing includes a pivot end 132, which is pivoted upon a pivot connection 134. As the motor rotates clockwise or counterclockwise, it draws the threaded nut 124 closer to or further from the pivot point 132. The lever 102 is free to pivot about the shaft of the fastener 144 (which is secured to nut 124). Consequently, when the nut 124 moves, it carries lever 102 with it and rotates the lever 102 about pivot 106. Movement of the lever 102 moves the buckle 26 from its stowed or operative position, close to the hip of the occupant, to a more forward position. Limit switches such as 105 are used to generate a signal to turn off the motor when the lever 102 has attained the desired positions. It is contemplated that with the occupant in the seat and when the door closes, the motor 130 will be activated, moving the buckle to its forward or activated position. With the buckle in this position, it will be more convenient for the occupant to secure the tongue to the buckle. The buckle 26 and/or tongue 24 will have a known type of sensing (or switch) mechanism 105a (such as a Hall Effect sensor and magnet) to determine whether or not the tongue is connected into the buckle. When the tongue is latched, a signal is sent to the motor (typically through a controller) causing it to reverse wind, bringing the buckle and the tongue to the desired, required position as illustrated in FIG. 2.

Reference is again briefly made to FIG. 3, which shows the motor 130 indirectly connected to the worm gear through a gear box 136. In this embodiment the motor and gear box are pivoted at 132 to a pivot link 134.

Figure 2A:
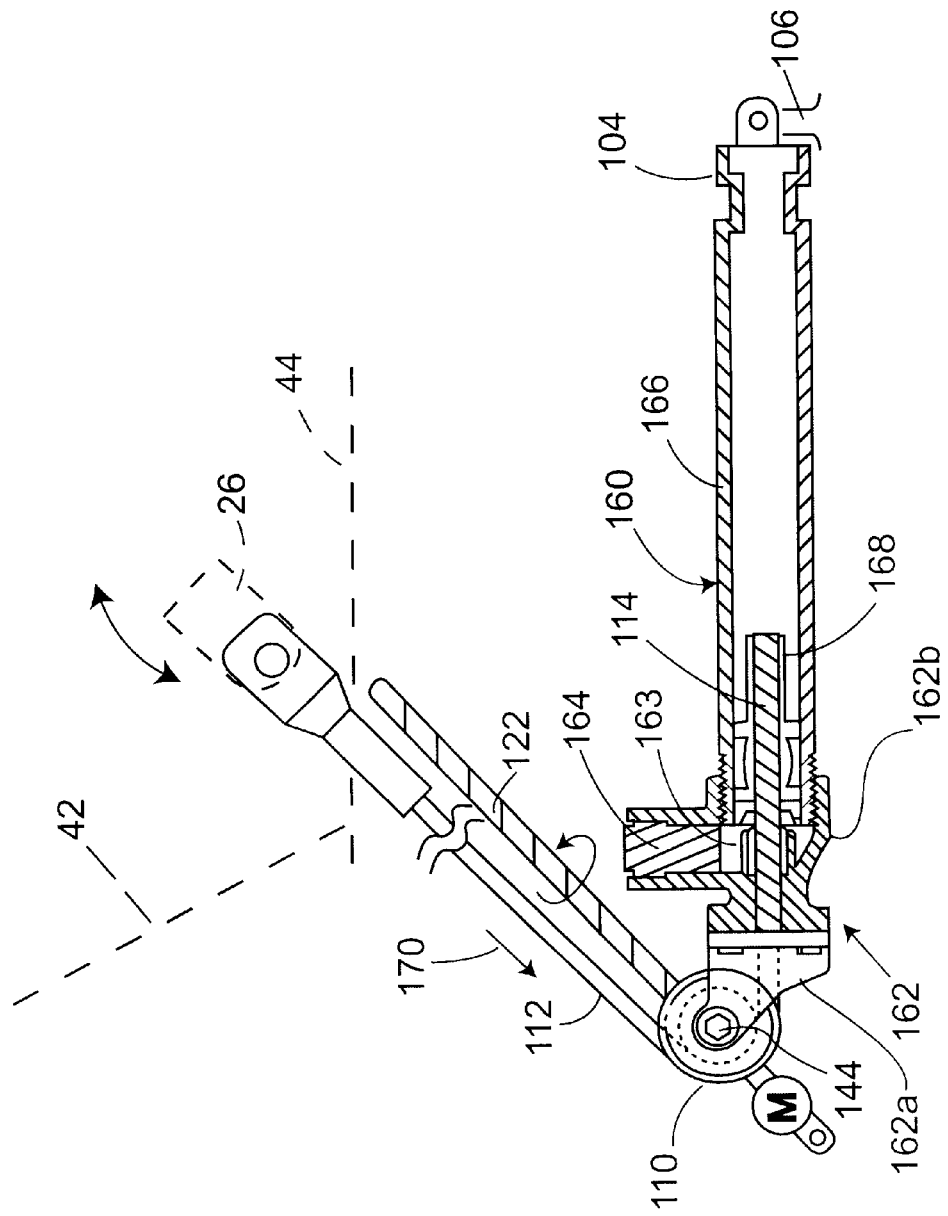
FIG. 2a shows a variation of the above embodiment.

In FIG. 2a, the buckle presenter shown therein replaces the function of lever 102 (of FIG. 2) with a pivoted pretensioner (which is also referred to in the art as a belt tightener). The pretensioner 160 includes a housing 162, which is divided into two portions. A first portion 162a supports the pulley wheel 110 in either a stationary manner or in a manner in which the pulley can rotate. The fastener 144 extends through an opening in the center of the pulley wheel and is connected to the nut 124 in the manner as described above. The second portion 162b of the housing 162 includes an ignitor of known construction which includes a quantity of propellant 164, which when heated produces heated gas. The housing 162 is also communicated to tube 166, end 104 of which is pivotally connected to the pivot 106. End 114 of the cable 112 is connected to a piston 168. During an accident, a controller sends a signal to the pretensioner 160, which causes the release of gas, which forces the piston down the tube 166. As the piston 168 is propelled down the tube it carries the cable 112 with it and pulls the buckle 26 to a lower position in the direction of arrow 170 to tighten the seat belt about the occupant. The piston can include teeth or other coupling means, which prevent the piston from being dragged down the tube in response to the occupant loading the seat belt, belt and cable. During non-emergency conditions the buckle presenter operates in the manner of the presenter of FIG. 2. The presenter will move from its rest position as illustrated, with the pretensioner tube generally horizontal to an elevated position in which the buckle is presented forwardly. As before the motor rotates the worm gear or lead screw causing the nut 124 to move up and down the gear.

Figure 4:
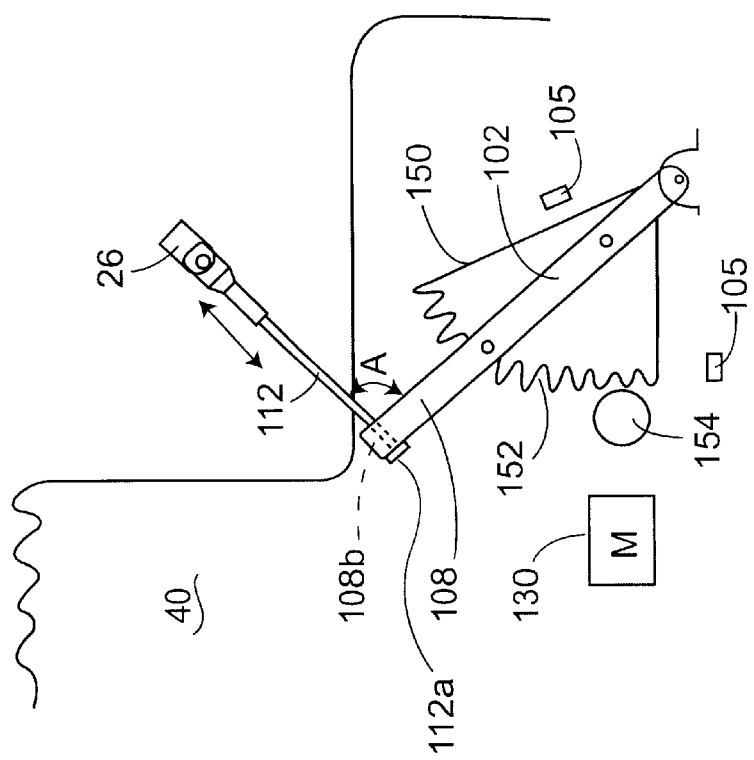
FIG. 4 shows a second embodiment of a seat belt buckle presenter.

Reference is made to FIG. 4, which illustrates an alternate embodiment of the invention. In this embodiment, the lever 102, carrying the cable 112 and buckle 26, is fitted with a sector gear 150, having teeth 152 thereon. A motor 130 is coupled to the sector gear 150 through a smaller pinion gear 154. As the motor rotates, the buckle is moved upwardly and downwardly between the lower position and upper position. Limit switches 105 can also be used to stop the motor when the sector gear has attainted the desired position. FIG. 4 further shows an alternate way of connecting the cable 112 to the lever 102. In this embodiment the end 108 of the lever includes a bore 108b oriented at the desired angle A relative to the axis of the lever 102. The cable 112 includes a termination 112a, which prohibits the cable from being pulled out of the lever. The end of the lever, about the bore, is crimped to prevent the cable from slipping through the bore. Other means of fixing the cable to the lever are within the scope of the present invention.

Figure 4A:
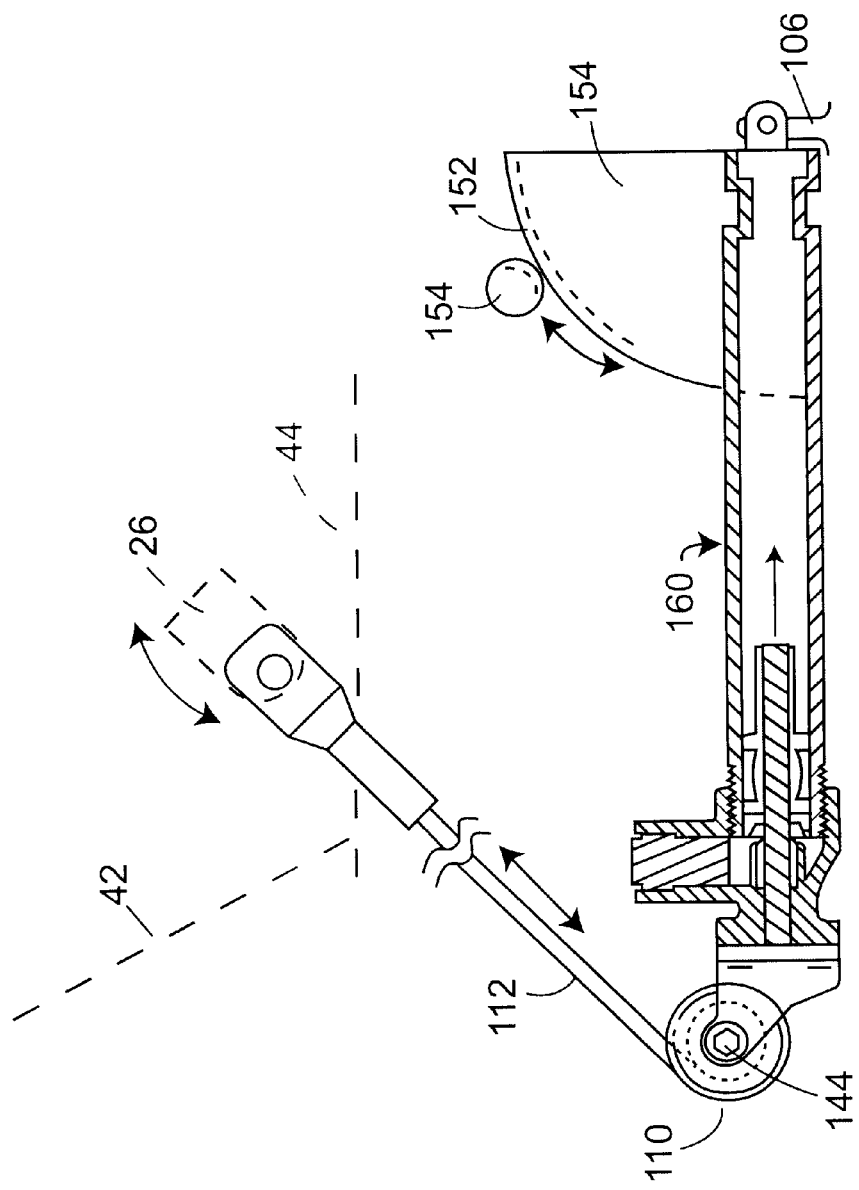
FIG. 4a shows a variation of the above embodiment.

In FIG. 4a, the sector gear 154 is mounted to pretensioner 160 and the motor 154 is mounted at an elevated position within the seat cushion 44. The driving engagement of the motor teeth with the teeth of the sector gear will position the pretensioner 160 (lever) and the buckle 26 between the illustrated rest position and an activated position to facilitate connection with the tongue and then back to the rest (engaged) position once the tongue is inserted.

Figure 5:
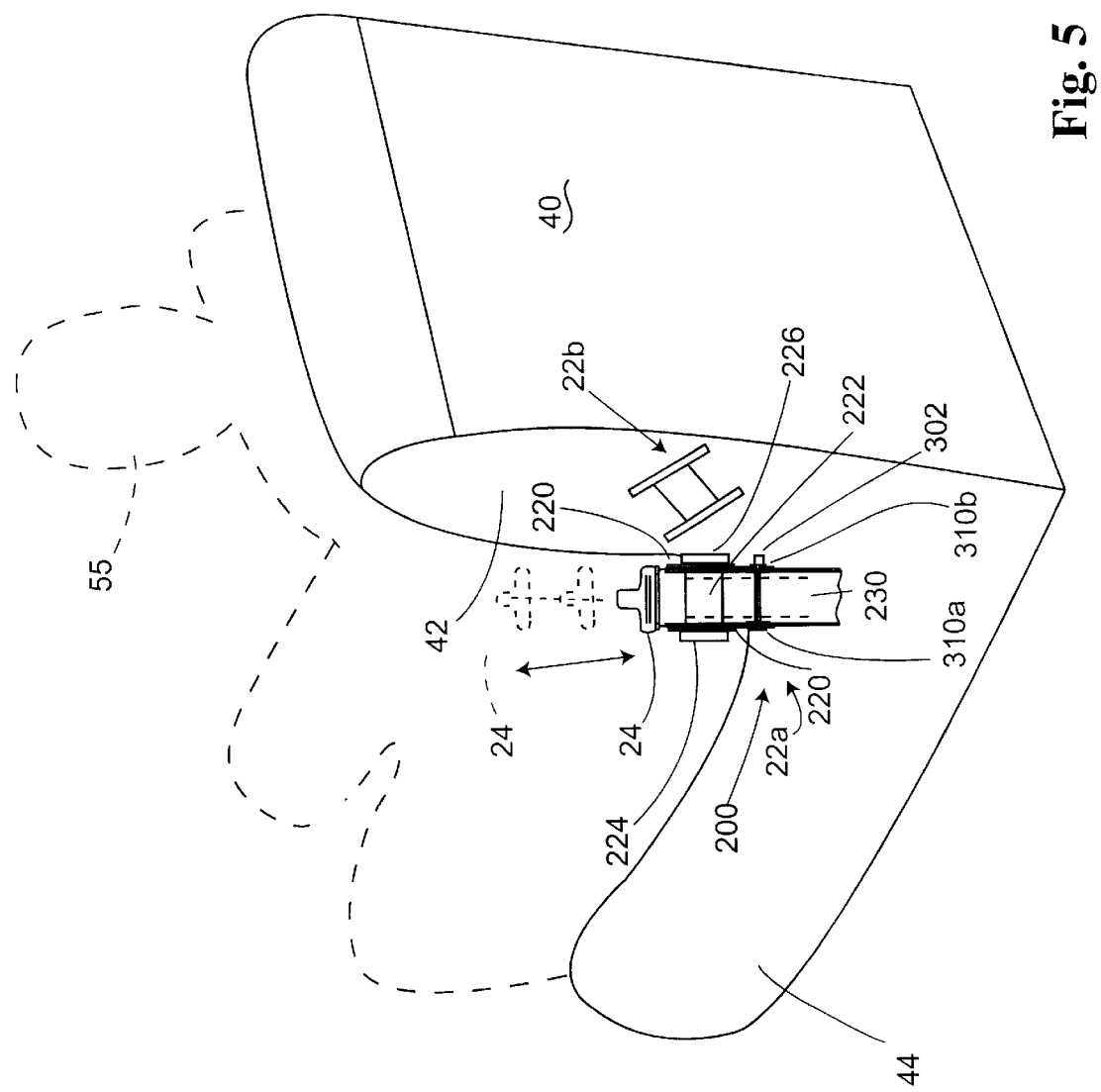
FIG. 5 illustrates an oblique view of the seat and illustrates the positioning of the lap belt retractor.

In addition to presenting the buckle at a more convenient location for the occupant, the invention also contemplates moving the tongue out from its stored or stowed position to enable the occupant to more easily find, grasp and then insert the tongue into its corresponding buckle. The following tongue presenter 200 can be used in combination with or independent from the buckle presenter 100 depending on the specific application. Reference is made to FIGS. 5–11, which show many of the major elements of a tongue presenter 200. In the preferred embodiment, the tongue presenter 200 is used with a two-retractor seat belt system. In the illustrated embodiment, the lap belt retractor 22a is part of the tongue presenter 200. FIG. 5 illustrates an oblique view of the seat 40 and illustrates the preferred positioning and orientation of the lap belt retractor 22a. The location of the shoulder belt retractor 22b is also shown. The tongue 24, which is secured to the lap belt, is shown in its stowed or retractor position adjacent the retractor 22a. It should be appreciated that if the retractor 22a is exposed, the stowed position of the tongue will generally be at or near the top of the retractor. However, if the retractor is installed in the vehicle seat 40, the lap belt will extend through an opening in the upholstery or trim. In this case the rewind spring of the retractor will retract the lap belt and stow the tongue against or close to the upholstery or trim. The solid line representation of the tongue shows the tongue in its stowed position. FIG. 5 also shows the tongue in phantom line to illustrate its movement from the stowed position to an activated position in response to the activation of the tongue presenter 200. With the lap belt retractor mounted at an angle to the seat 50, as well as to the seated occupant, the tongue presenter 200 need only move the tongue linearly outward from its stowed position to present the tongue at a more convenient position, in front of the hip of the occupant 55. As illustrated, the retractor 22a is oriented at about 45 (40–50) degrees from the horizontal. The retractor 22a includes many of the components of a conventional seat belt retractor, such as a frame 220 and a spool 222 having a length of seat belt 30a wound thereon. The retractor 22a, as is conventional, includes a rewind spring 224 on one side thereof and locking mechanisms generally shown as 226 on the other side. The mechanisms 226, the spring 224 and spool 222 are supported in a known manner by various parts of the frame.

Figure 6:
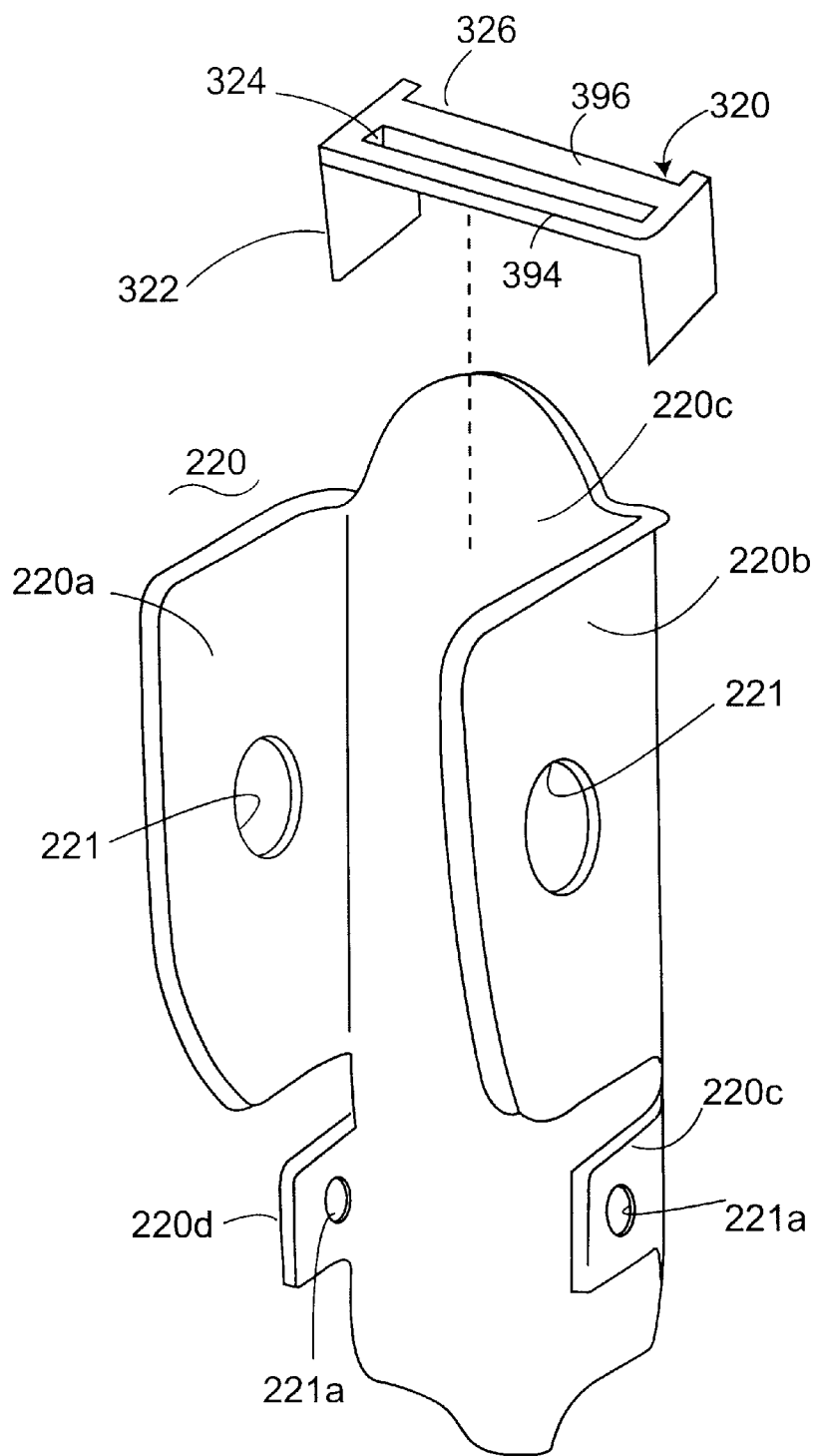
FIG. 6 is an isometric view of a seat belt retractor frame.

Reference is briefly made to FIG. 6, which diagrammatically shows the frame 220. The frame 220 is U-shaped and includes sides 220a and 220b and a rear 220c. Each of the sides includes a respective opening 221, which acts as a bushing for a corresponding side or end of the spool shaft. The frame includes various mounting features (not shown) to enable to frame to be mounted to a mounting surface such as the seat frame or vehicle pillar. The frame also includes two additional side portions or projections 220d and 220e each with an opening 221a. The portions 220d and 220d, as described below, support a shaft, gears and motor of the tongue presenter 200. As can be seen from FIG. 5 (also see FIGS. 1 and 8), the lap belt 30a extends outwardly from the spool 222 and is secured about a slot 24a of the tongue 24 in a conventional way. Similarly, the shoulder belt 30b is secured about slot 24a such that when the tongue 26 is moved, both the lap belt 30a and the shoulder belt 30b are moved.

As shown in FIG. 7 the lap belt retractor 22a further includes a moveable or driven presenter member 230, which acts as the tongue presenter mechanism. In the preferred embodiment this member 230 is in the form of a semi-rigid, flexible, plastic or metal tape, having a plurality of perforations or slots 232 formed therethrough. The presenter member 230 is positioned between the spool (and the roll of seat belt webbing thereon) and the rear 220c of the frame 220 (see FIG. 10). The presenter member 230, such as a perforated tape, is positioned against the rear 220c of the retractor frame. The spool and seat belt have been removed for the purpose of clarity. FIG. 7 shows the tongue 24 in its retracted or stowed position. While not shown, it should be appreciated that the lap belt 30a is secured to the slot 24a of the tongue 24.

The member 230 includes rows of slots 232, which assist in moving the tape up and down relative to the retractor frame 220 and in so doing move the tongue from its stowed position to its activated position. Secured to or formed as an integral part of the member 230, at a top portion 240 of the member 230, is a bezel or extension or guide 242 through which the lap belt 30a extends. FIG. 8 shows an integrally formed bezel or guide 242 having a narrow oval slot 242a with the lap belt extending through the slot and the tongue resting on the bezel 240. The retractor frame is not shown in FIG. 8.

FIG. 7 also shows a driving mechanism 300 that is also supported by the frame 220, which moves the presenter member 230 up and down. The mechanism 300 includes a motor 302 and shaft 304. The shaft is rotationally supported on frame parts 220d and 220e. The motor is also supported by frame part 220e. The shaft supports two tooth gears 310a and 310b, each of which have a plurality of driving teeth 312 which engage the tape slots 232. To prevent the tape 230 from moving away from the rear of the frame, the presenter 200 includes a guide 320. FIG. 6 shows one example of a guide 320. Many seat belt retractors include a web guide such as 322 that is fitted to the top of the retractor frame. The web guide 322 will often include an opening 324 of sufficient size to receive the seat belt 30a, which guides the seat belt away from the retractor. As shown, the seat belt guide 322 includes an additional notch 326 on a rear surface. With the web guide 322 in place upon the retractor frame the notch 326, in combination with the rear of the frame, defines the guide or passage which keeps the tape against the retractor frame. FIG. 9 shows an alternate version of the tape guide 320. FIG. 9 is similar to the top portion of FIG. 7 but shows a plurality of tabs 338 that are integrally formed by cutting and bending portions of the frame 220. Each tab 338 is spaced from the rear 220c of the frame and defines a guide or channel to hold and guide the tape as it moves. The tabs can also be formed, for example, by clip-on or snap-on members.

Under the appropriate conditions, as detailed below, the motor 130 rotates the gears 310a and 310b causing the tape to move out of the retractor frame. As the tape moves it carries with it the bezel 242 which in turn pushes the tongue outwardly in front and to the side of the occupant. In the illustrated embodiment the plane of the rear of the frame, i.e. the mounting plane 380, is parallel to a vertical plane that intersects the center line of the vehicle. As mentioned above the retractor 22a can be mounted at about 45 (40–50) degrees to the horizontal. Since the tape is semi-rigid, as it extends it will generally remain parallel to the mounting plane. In some installations it might be desirable to have the tongue, in its extended position, be placed closer to or farther from occupant, that is, from the vertical mounting plane. This can be achieved by mounting the retractor at a slight angle to the mounting plane. Depending on the angle of the retractor, the tongue's activated position will be closer to or farther from the above-mentioned vertical mounting plane.

The presenter 200 can include various sensors or switches to stop the motor after the tape has been moved to present the tongue. For example, the motor can be stopped after it has rotated a predetermined number of revolutions. Movement of the tongue to its activated position can be accomplished simply by counting revolutions of the motor. It is envisioned that the tape will be moved outwardly 13–20 cm (about 5–8 inches). Alternately, the motor 230 can be operated for a fixed time (assuming the speed of the motor is known) to achieve the new position of the tape. Instead of measuring the number of motor rotations or keeping track of time, the retractor can support a micro-switch (limit switch) which is activated by a feature, such as a protrusion on the tape. The protrusion causes the micro-switch to change state to deactivate the motor after the tape has moved outwardly. Another micro-switch can be used to stop the retraction of the tape at the proper position upon withdrawal of the tape to its stowed position.

With the tape, bezel and tongue in the activated position, the occupant grasps the tongue 24, pulls the tongue away from its activated position (also away from the lap retractor 22a) and inserts the tongue into the seat belt buckle. As the tongue is moved an amount of webbing is protracted from the spool. The tongue presenter 200 further includes a mechanism 360 that causes the tape to retract and be moved back to its stowed position. This can be accomplished as follows: For example, the tape can continue to remain in its activated position until the tongue is latched within the buckle. The buckle can include a switch 105a, which generates a signal to indicate that the tongue is within the buckle. This signal can also be used to cause the tape motor 302 to reverse and return the tape to its stowed position.

Figures 10, 11:
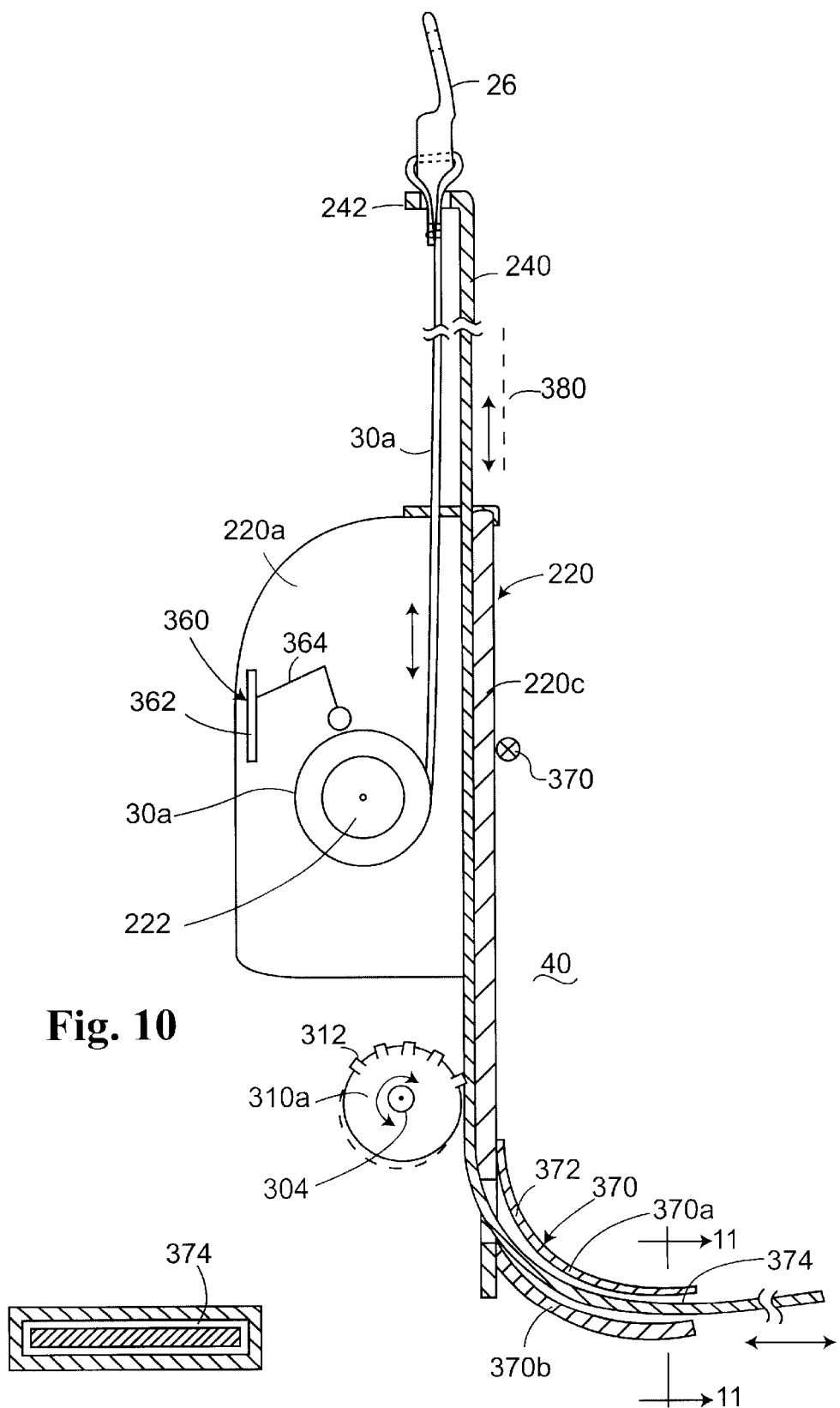
FIG. 10 is a cross-sectional view of the tongue presenter and also shows a further embodiment of the invention.
FIG. 11 is a cross-sectional view through section 11—11 of FIG. 10.

Alternately, rather than waiting for the tongue to be buckled (in the buckle), the preferred embodiment begins to retract the tape 240 as soon as the tongue is moved from its activated position (as determined by the activated position of the presenter mechanism 240). FIG. 10 is a cross-sectional view of the retractor 22a and shows the lap belt 30a rolled upon the spool 222. As shown, the tape 240 has already extended the tongue to its activated or presented position. As can be seen, the bezel 242 is extended and has carried the tongue away from the retractor. The mechanism includes a micro-switch 362, mounted to the retractor, having feeler arm 364, which is biased to lie on the roll of webbing wound about the spool. The amount of webbing remaining on the spool 222 with the tongue in its activated position can, in general, be predetermined. When the tongue is moved away from this activated position, additional webbing is protracted from the roll, which reduces the diameter of the roll of webbing on the spool. The micro-switch 362 (and its lever 364) is designed to change state (turn on or turn off) when the diameter of the roll of webbing is further reduced. The signal generated by the mechanism 360 is used to reverse wind the motor 302 causing the tape (and bezel) to be moved to its stowed position.

FIG. 10 also shows a further embodiment of the invention, which comprises an elongated lower tape guide mechanism 370. The guide mechanism 370 comprises a tubular housing 372, which transitionally curves away from the retractor frame. The tubular housing 372, having walls 370a and 370b, includes a rectangular opening 374 through which the tape 240 extends. As mentioned above, in some installations the tape 240 will extend 13–22 cm to the activated position. In its stowed condition, a large amount of the tape will be extended below the retractor. The housing 372 directs this extending length of tape in a desired direction such as underneath the vehicle seat (see numeral 40). The housing 372 may be truncated or long enough that the tape always remains enveloped by the tubular housing. The wall 370a can also be formed by an extending part of the retractor frame.

Reference is made to FIGS. 12–14. FIG. 12 is a rear view of the seat. In some installations it may not be possible to mount the retractor 22a parallel to the above-mentioned mounting plane. FIG. 12 diagrammatically shows one such alternate mounting configuration in which the retractor 22a is considerably underneath the seat cushion 44. Conceptually, to achieve this configuration, the retractor of FIG. 10 is rotated about axis 370, which moves the frame 220 substantially out of the mounting plane and then the retractor is slid further within the cushion or further under the cushion. If the motor 302 was activated to move the tape and tongue, in the manner described above, the tongue will be moved substantially away from the side of the sear cushion and away from the occupant. FIG. 13 includes many of the components shown in FIG. 10 and also shows the retractor at a substantial angle relative to the mounting plane 380, as well as located within the seat cushion 44. Extending from the retractor frame 220 is an upper tape guide 390. The guide 390 is hollow and is sufficiently wide to receive both the seat belt and the tape 240. As can be seen, the guide 390 is curved and sufficiently long so that the tape exits the cushion generally parallel (or a determinable angle) relative to the mounting plane 380. FIG. 14 shows that the guide 390 continues to be angled forwardly about 45 degrees. When the motor 302 is activated, the tongue, bezel and tape will move straight out from the exit end of the guide 390 and be positioned at the orientation achieved by the presenter of FIG. 10. As can be seen, the tape 240 is interior to the walls 290a and 290b of the guide. FIG. 15 shows a further variation of an upper tape guide. Conceptually this tape guide 392 can be viewed as a curved, enlarged web guide 320. Reference is again made to FIG. 6. Those portions or walls 394 and 296 of the web guide 230 forming opening 324 and slot 326 are extended upwardly to from the elongated and curved guide 292 of FIG. 15. In this case the tape 240 is supported on the outside of wall 396 (see FIG. 15). The seat belt is positioned within the now elongated opening (channel) 236.

Figure 18:
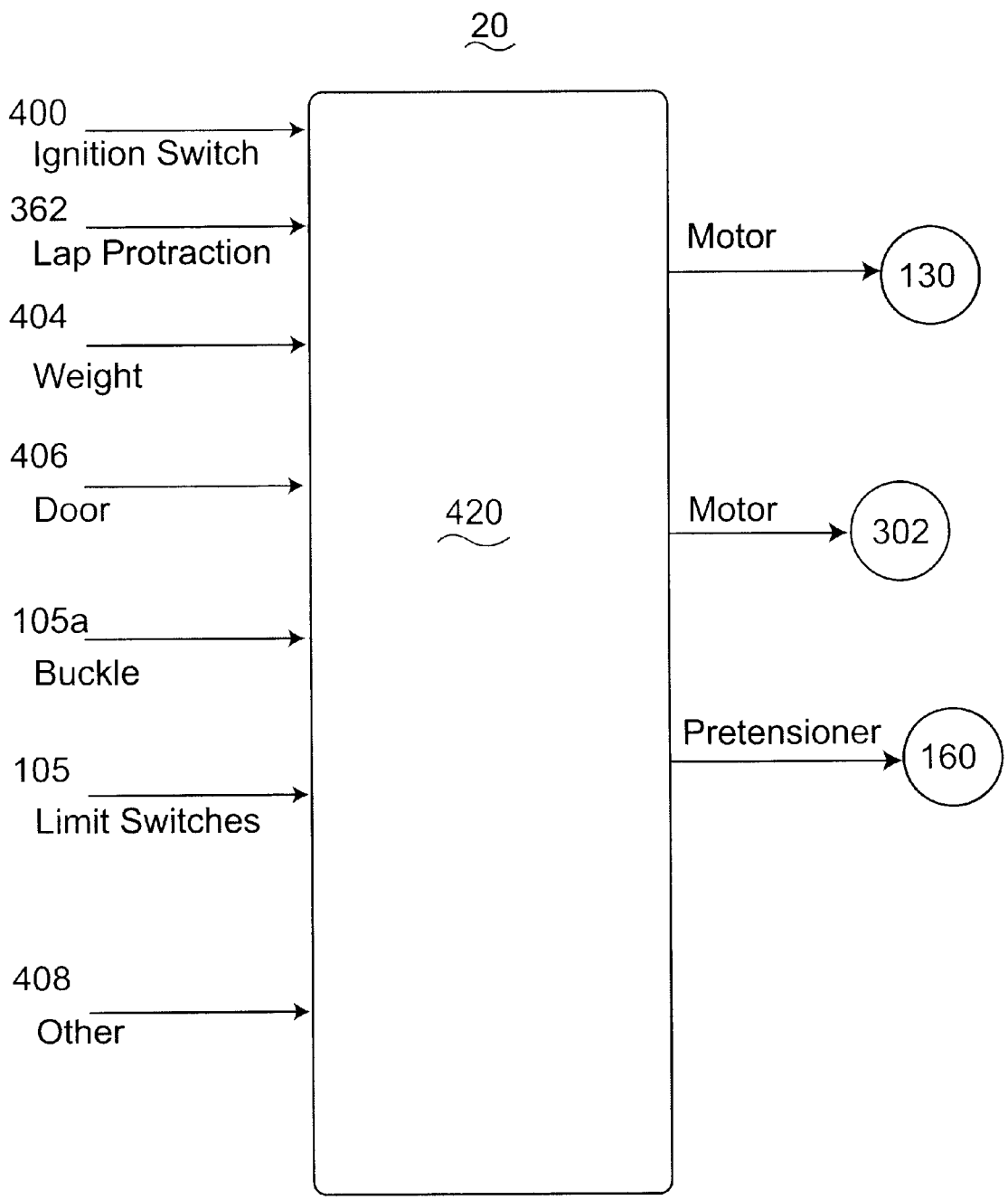
FIG. 18 diagrammatically shows a control system.

The present invention utilizes a plurality of control signals that are generated by a number of control devices including sensors and switches to selectively present and retract the tongue and/or the buckle. These control devices (see FIG. 18) include: an ignition switch 400, which generates a power-on or power-off signal, a seat belt sensor 402, such as the above-mentioned micro-switch 362, which generates a signal to indicate that at least the lap belt is being protracted from the lap retractor 22a, a weight sensor(s) 404 to generate a signal that the occupant is properly seated in his or her seat, and a door switch 406 to generate a signal to indicate whether the door is open or closed, buckle switch 105a which generates a signal indicating that the tongue 24 is latched in the buckle 26 and the various limit switches such as 105. Each of the output signals is received by a controller 420, which generates a signal to control the buckle motor 130 and/or the tongue motor 302. Various other sensors and limit switches, including mechanism which sense the position of the lever 102 and tape 240, would also be received by the controller 420.

Reference is made to FIGS. 16 and 17, which separate the function of the tongue presenter from that of the seat belt retractor 22a. The tongue presenter 200a includes a frame or bracket 430, which basically comprises a thin plate 432 with the tabs 338 to hold the tape 240 thereto. The frame 430 is secured to the seat frame at the desired angle and location. The tape includes the bezel 242, which when raised lifts the tongue 24 and protracts webbing from the spool 222 of retractor 22a (shown diagrammatically). The bezel is shown at an angle to the tape so the bezel is positioned parallel to the top of the seat. The presenter 200a can also include a lower guide mechanism 370 (as shown in FIG. 13). The lower guide mechanism 370a in FIG. 17 includes an arcuate sheet or plate 440, with tabs 338.

The basic operation of the control system is to present, that is to raise and lower, the tongue and buckle presenters at the appropriate time to make it more convenient for the occupant to grasp the tongue and insert it within the buckle. Depending on the particular vehicle, both presenters or only one presenter may be used.

In a simple configuration, the system 20 (diagrammatically shown in FIG. 18) monitors or determines when an occupant has sat down on the seat cushion (using the weight sensor 400 or series of weight sensors) and then moves the tongue presenter 200 (and tongue) from its stowed position to its forward or active position and/or moves the buckle presenter 100 (and buckle) from its stowed position to its corresponding forward or active position. After the tongue 24 is inserted (and locked) in the buckle (as sensed by buckle switch 105 of known variety including a Hall Effect, reed or mechanical switch) the control system moves the buckle presenter (including the buckle with the tongue locked therein) to the stowed position while also stowing the tongue presenter. As can be appreciated, if the system includes a pretensioner 160, the pretensioner is deactivated at least until the buckle and tongue have been moved to the stowed position.

A more complete system might recognize that just monitoring whether or not the occupant is seated might not be a sufficient indication to present the tongue and/or buckle to their active positions, as the seated occupant may have no intention of driving the vehicle and as such there is no need to activate the tongue and buckle presenters. This more complete system would also interrogate whether or not the adjacent vehicle door has been closed (such as by interrogating the door switch 406) and use the combined parameters of the seated occupant in combination with door closure as the control parameter to present both the tongue and the buckle.

However, experience shows that once seated, an occupant may have occasion to leave the vehicle or attempt to leave the vehicle and then change his or her mind regarding exiting the vehicle. For example, if the occupant intends to leave the vehicle, it is probable that the occupant would open the door. A more advanced system then needs the ability to respond to this activity and present the buckle to its activated position thereby making it more convenient for the occupant to release the tongue (from the buckle) and exit the vehicle. Consequently, the more advanced system would also interrogate any changes in the status of the door switch and bring the buckle (and locked tongue) to its activated condition.

There are other situations that may also indicate the occupant's possible intention to exit the vehicle. This situation may be indicated if the engine (which had been running) is shut off. The status of the engine can conveniently be sensed by interrogating the condition of the ignition switch 400. Various other vehicle parameters can be sensed to present and withdraw the buckle and tongue. For example, rather than withdrawing the buckle presenter 100 when only the tongue has been inserted in the buckle, the withdrawal of the buckle presenter can be delayed until the occupant has placed the transmission in gear as sensed by a transmission sensing sensor 408.

The following is a more detailed discussion of a control algorithm to control the position of the tongue and of the buckle.

1. Interrogate control mechanisms including: weight sensor 404, door switch 406, ignition switch 400, web sensor (switch) 362, buckle sensor (switch) 105, and status of the transmission 408.

2. Determine if the occupant is properly seated within his or her seat. Monitor the output of the weight sensor to determine if the occupant is properly seated in the seat. If the occupant is seated (and the door is closed), generate control signals to: a) move the buckle presenter from its stowed position to its activated position and b) move the tongue presenter from its stowed position to its activated position. These signals cause the buckle presenter motor to rotate the buckle presenter to its activated position and cause the tongue presenter motor to move the tape away from the retractor frame, thereby lifting the tongue.

2a. Determine if the occupant has opened the door (after being seated), which is an indication that the occupant desires to leave the vehicle. If this situation has occurred before the occupant has inserted the tongue into the buckle, generate control signals to cause the tongue and the buckle to move to their respective stowed positions to enable easy egress from the vehicle.

3. Determine if the occupant has begun to pull the tongue away from the tongue presenter (with the tongue in its activated position). Once the occupant pulls the tongue away from the retractor, use the status of the web switch 362 and generate a control signal causing the tongue presenter motor to return the tape to its stowed position.

4. Determine if the occupant has pulled the lap belt out sufficiently and latched the tongue into the buckle. Monitor the buckle switch or sensor 105 to determine if the tongue has been latched to the buckle and in response to a buckle switch signal cause the buckle presenter motor to move the buckle (and latch tongue) to its stowed position.

4a. Determine if the occupant has opened the adjacent vehicle door. With the tongue within the buckle, there may be a situation in which the occupant subsequently opens the adjacent door, as for example, to exit the vehicle or for the purpose of obtaining some information or for some other reason. Monitor the status of the door switch 406 to determine an open door condition and elevate the buckle presenter to its activated condition in anticipation that the occupant will unbuckle the tongue from the buckle and exit the vehicle. Determine if the door is then closed (by sensing the status of the door switch), without unbuckling the tongue (by sensing the state of the buckle switch) from the buckle and cause the buckle presenter to return to its stowed position. However, if the occupant has unbuckled the tongue from the buckle (as sensed by the status of the buckle switch) return the buckle presenter (by activating its motor) to its stowed position.

5. Determine if the ignition switch is in an active or on condition. Monitor the state of the ignition switch. In this step, the state of the ignition switch does not change the status of the buckle or the tongue presenter, that is, if they are in their stowed position they remain in the stowed position or, assuming that the tongue has not yet been latched in the buckle, the presenters will remain in their respective activated positions.

6. Determine if the ignition switch has been turned off. Monitor the state of the ignition switch to see if it has been cycled to its off state. If the buckle presenter is in its stowed position the cycling of the ignition switch causes the buckle presenter motor to move the buckle presenter to its activated position, assuming that the tongue is latched in the buckle (as sensed by the status of the buckle switch).

6a. Determine if the tongue been unlatched from the buckle. Monitor the state of the buckle switch to determine if the tongue is in the buckle. If the tongue has been unlatched from the buckle, the buckle presenter is moved to its stowed position.

6b. Determine if the ignition switch has been cycled again (with the tongue remaining within the buckle). Monitor the state of the ignition switch to see if it has been cycled to its on state. The buckle presenter is again moved to its stowed position.

FIGS. 19a–g define a more detailed method of controlling the tongue and buckle presenters.

Reference is made to FIGS. 19a–19g, which illustrate the process steps or logic performed within the controller 420 to control the motors 130 and 302 of the buckle presenter 100 and tongue presenter 200. In the description below, it is assumed that the system 20 includes a more elaborate weight sensor 404 than described above. For example, a weight sensor may include three sensing elements 404a, b and c. Elements 404a and b are weight-sensing elements installed within the cushion of the seat, while element 404c is a weight or force sensing element located in the seat back. If all three sensors indicate a signal, force or weight greater than a threshold value, this is taken as an indication an occupant is properly seated within the seat. The process begins with block 500, which then instructs the controller to read the output signals W0, W1 and W2 of each of the respective weight sensors 404a,b,c to determine if they are above a respective determinable threshold Th0, Th1, Th2. As an aside, it should be noted that one, two, three or more weight sensors can be used in the following process. If it is determined that all three sensors generate signals above their respective thresholds (see decision block 502), the controller interrogates the state of the door switch (see block 504) to determine in block 506, whether or not the door is open or closed. If the door is closed, as continued in FIG. 19b, the controller 420 reads the status of buckle switch 105 as shown by block 508. Thereafter, the controller determines if the switch 105 is closed, indicating whether or not the tongue 24 is in the buckle 26 (a NO logic condition) or if the buckle is open (a YES logic condition) as shown in decision block 510. Thereafter, the controller in block 512 causes the presenters to move to an up or activated condition by sending a signal to motors 105 and 304. As mentioned above, the controller 420 tries to anticipate the motion of the occupant and tries to determine whether or not the occupant intends to exit the vehicle. The controller once again interrogates the status of the door switch 406 in block 514 to determine in block 516 whether or not the door is open or closed. If it is determined in block 516 that the door remains closed, the controller interrogates the status of the microswitch, such as 362 in block 519, to determine in block 520 if additional webbing has been pulled from the seat belt retractor. If, however, the decision of block 516 indicates that the door is not closed, then in block 522 the controller returns both the tongue and the belt presenter to their stowed position (as it is assumed the occupant is about to exit the vehicle) and the process reinitiates at block 500. Returning to block 520, if the controller determines that the tongue has been moved from its activated position, the controller generates a signal in block 524 to motor 304, causing the tongue presenter 200 or 200a, that is tape 240, to be moved to its stowed position. At this point, the controller assumes that the tongue has been withdrawn from its activated position and determines whether or not the tongue has been received within the buckle (see block 526). The controller determines in block 528 whether or not the buckle switch is closed. Thereafter, the controller in block 530 commands motor 130 to retract or move the buckle presenter 100 to its stowed position, carrying the buckle and tongue to their occupant protecting position. At this point the seat belt is secured about the occupant and the vehicle is ready to be driven.

Figure 19A:
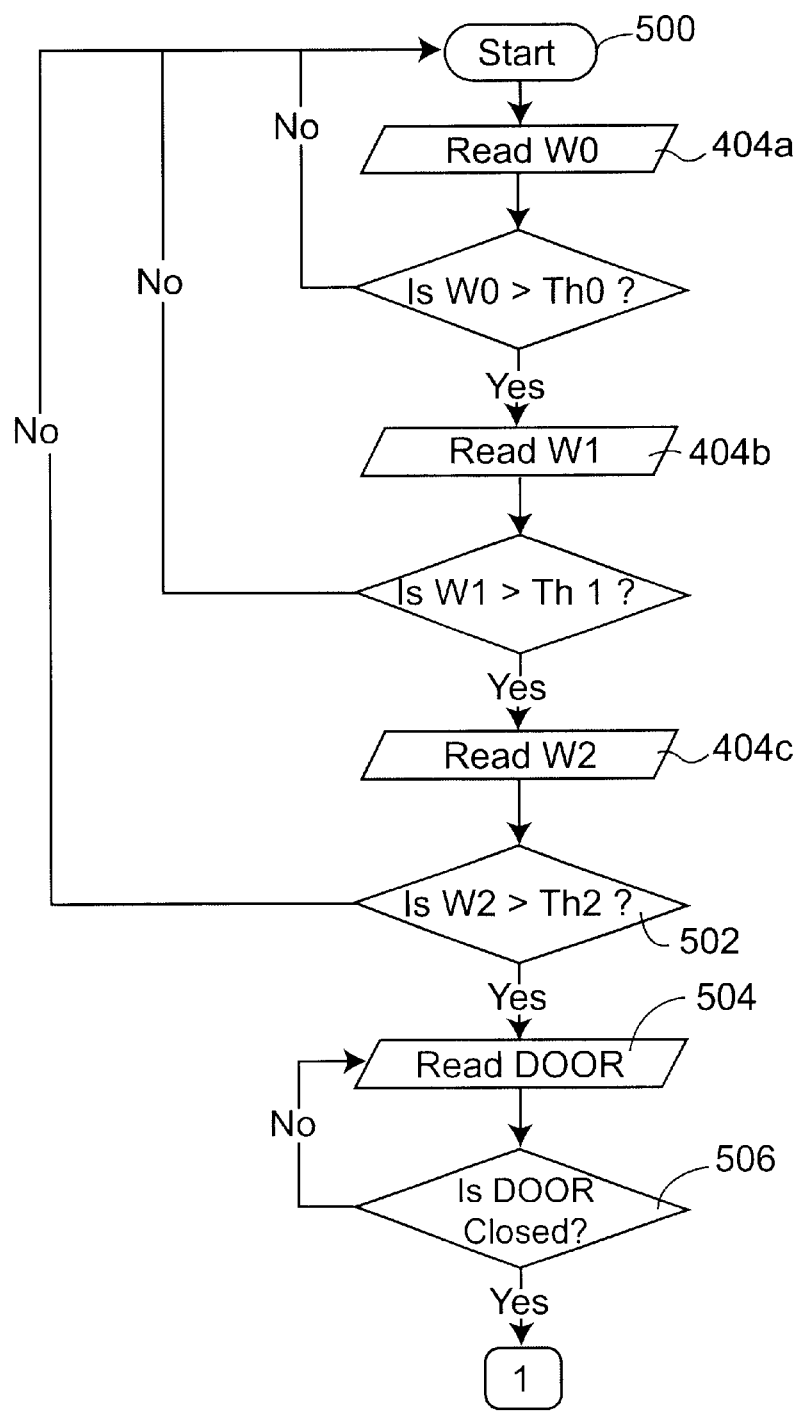
FIGS. 19a–g describe a control algorithm.
Figure 19B:
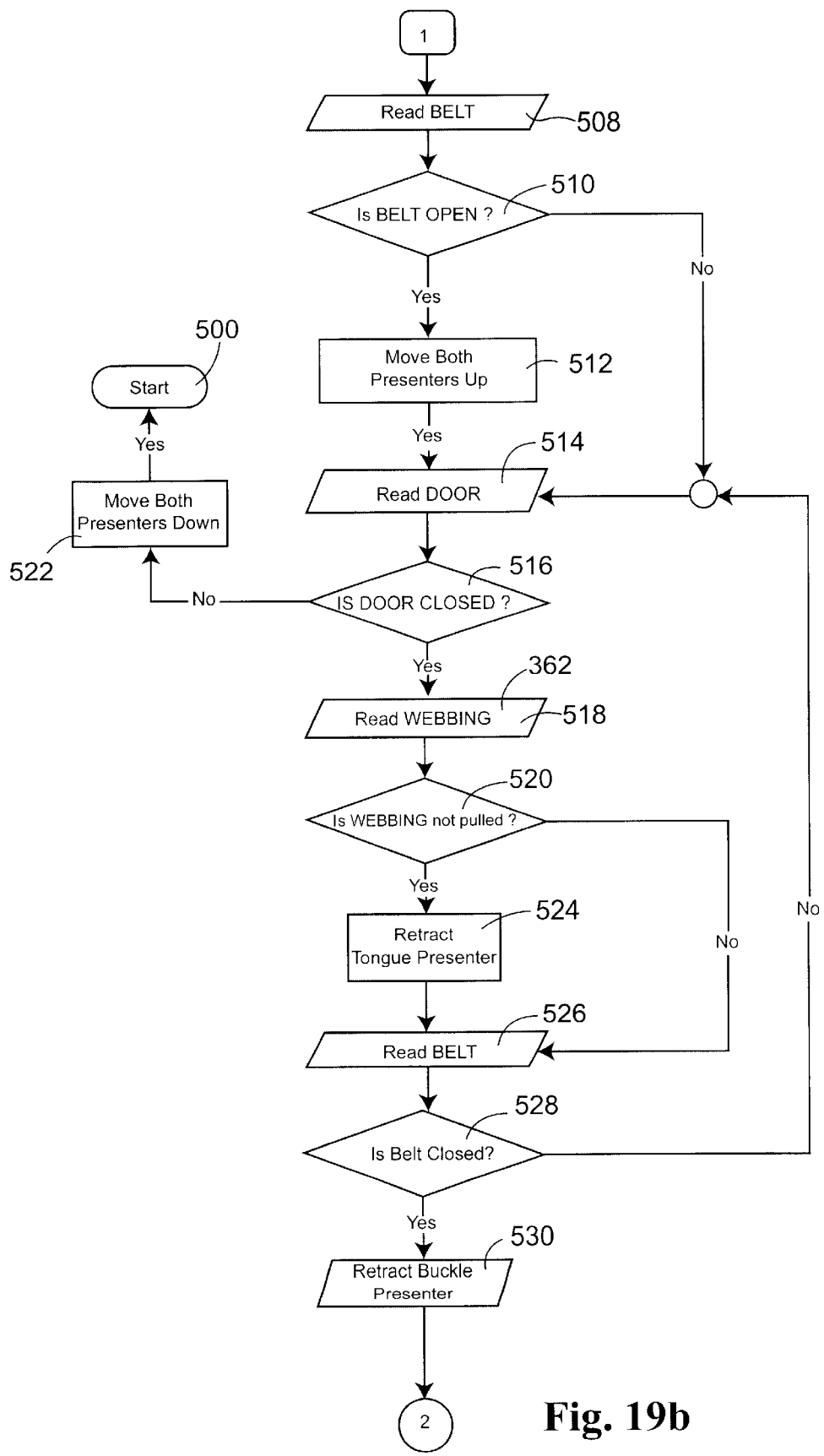
Figure 19C:
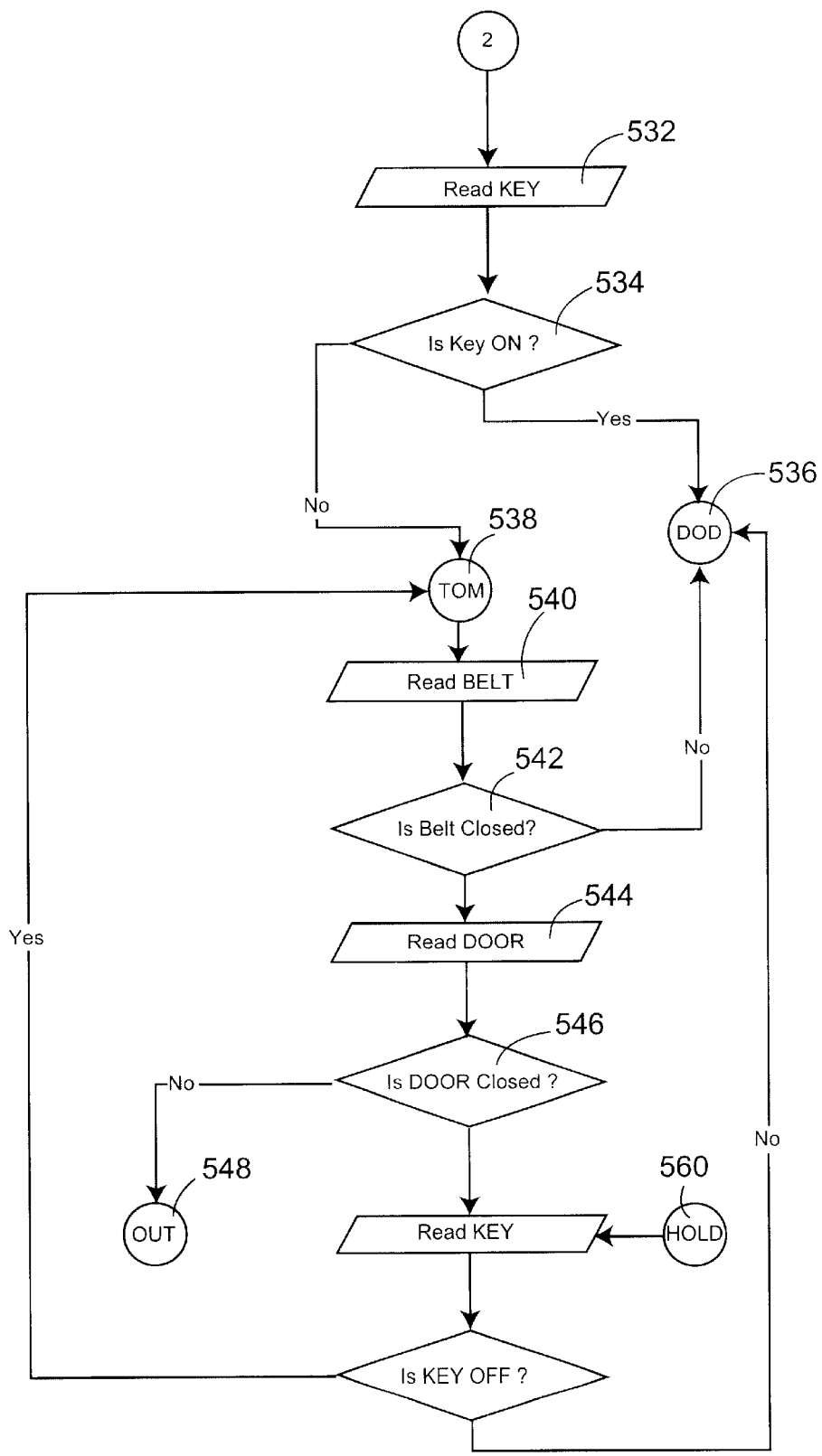
Figure 19D:
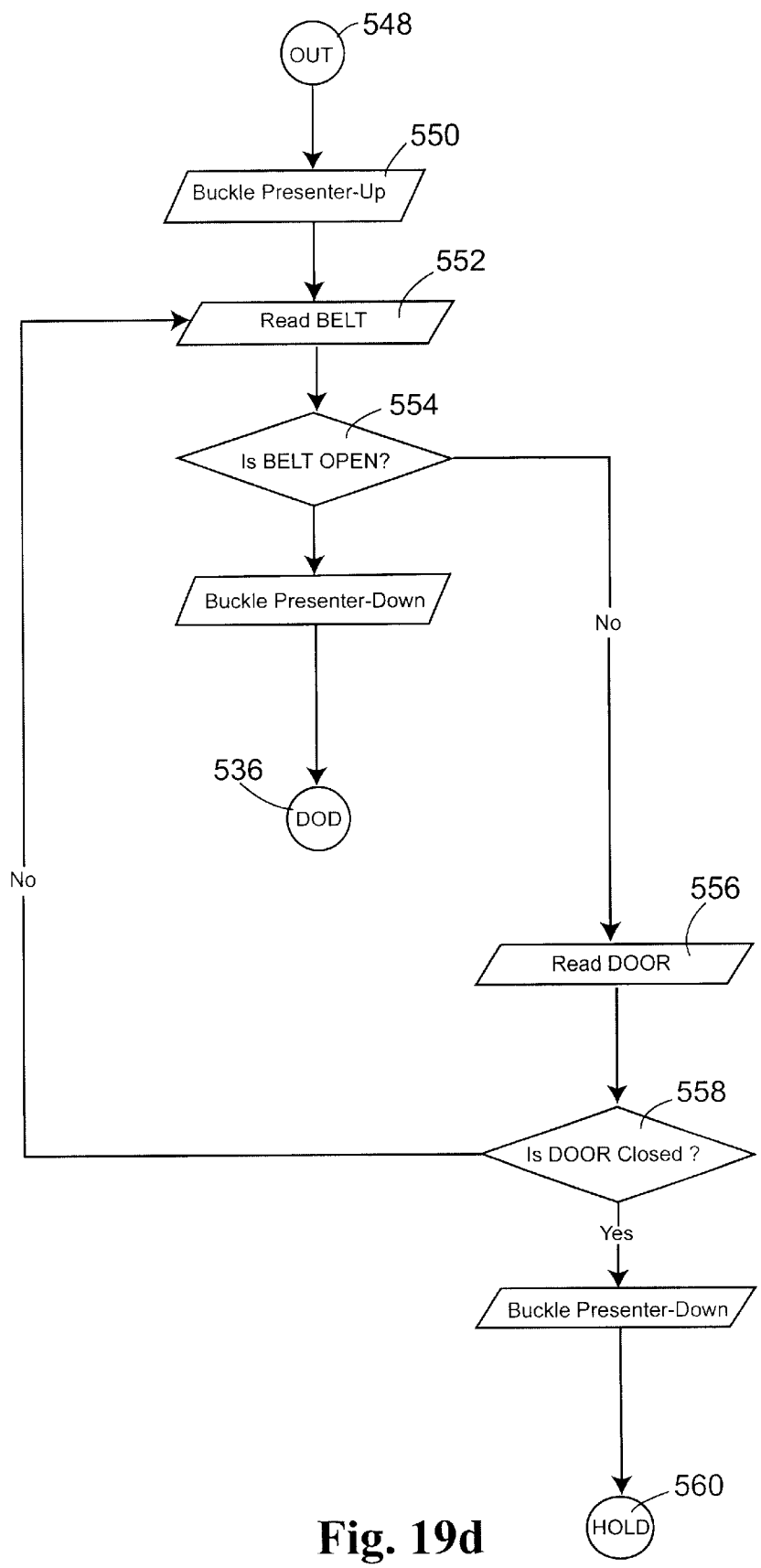

As continued on FIG. 19c, the controller interrogates the status of the ignition switch in block 532 and if the key is on (see block 534) the process moves to an intermediate condition identified by block 536. This condition, as described below, is also entered if the seat belt is opened. If, however, the key is off the process goes to an intermediate condition 538 whereupon the processor assumes that the ignition switch had been on, i.e., the engine had been running, and interrogates in block 540 the status of the seat belt to see if the occupant has released the tongue from the buckle as determined in block 542. Thereafter, if the tongue is still latched in the buckle (and having previously determined that the engine has been shut off) the controller interrogates whether or not the door is open in blocks 544 and 546. If the door is open (a NO logic condition) the process continues with intermediate step 548 continued on FIG. 19d in which the controller anticipates that the occupant wishes to exit the vehicle and causes the buckle presenter to move to an up or activated position (see block 550) thereby making it easier for the occupant to release the tongue from the buckle. Subsequently, the status of the buckle switch 105 is read (block 552) and if the tongue has been removed from the buckle (see block 554), that is the buckle is open, the controller once again moves the buckle presenter 100 to a down or stowed condition. At this point, the door is open, the ignition off and both presenters are in a stowed condition. Thereafter, the logic returns to condition 536. If, however, the result of block 554 indicates that the buckle and tongue remain together, the controller again interrogates the status of the door, in block 556 to determine in block 558 whether or not the door is open or closed. If the door is open, the logic returns to block 552, however, if the door is closed, the controller once again moves the buckle presenter to a down or stowed condition, thereby moving the buckle presenter down (the buckle and still-locked tongue moved to their driving position about the occupant). Thereafter, the logic continues with an intermediate condition 560, also found on FIG. 19c, in which the status of the key is again sampled.

Figure 19E:
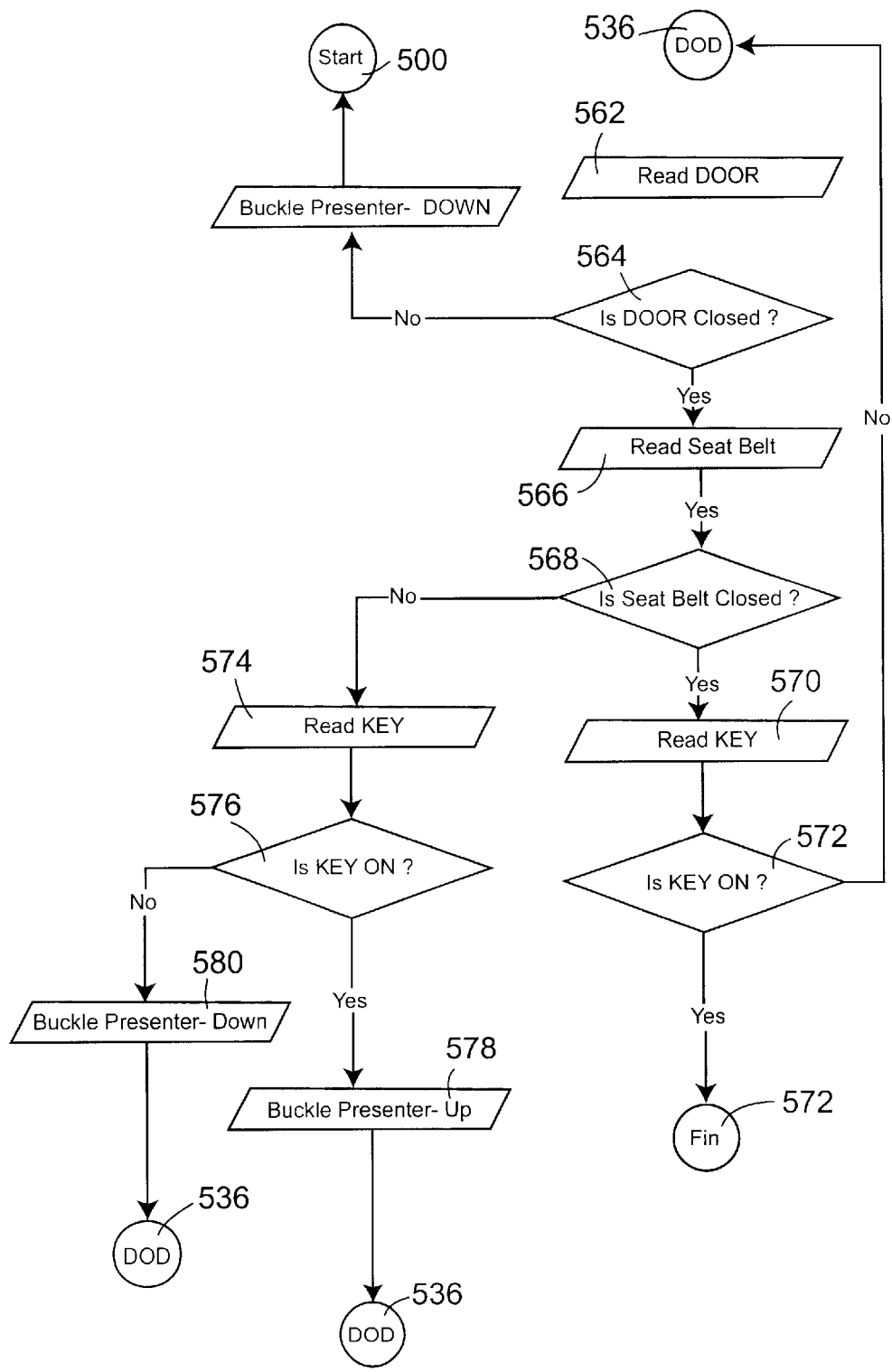

Reference is made to FIG. 19e and the intermediate logic step 536. Thereafter, the door switch (see block 562) is once again read and if the door (see block 564) is open, a NO logic condition, the buckle presenter is moved down and the process reinitiates at block 500, which is the start condition. If, however, the door is closed, the status of the seat belt switch 105 is again interrogated in block 566. If the seat belt remains closed and the ignition key is on (see block 570) the buckle presenter remains in its stowed position with the buckle and tongue secured about the occupant and the logic continues at intermediate condition 572. If, however, the seat belt is open (a NO logic condition) then in block 574 and 576 a determination is made as to whether or not the key is on (that is whether or not the engine is on or off). If, however, the seat belt is open and the ignition key turns on, the buckle presenter in block 578 is moved to an up position. If, however, the key turns off, the buckle presenter in block 580 is moved to a down position and the logic returns to condition 536.

Figure 19F:
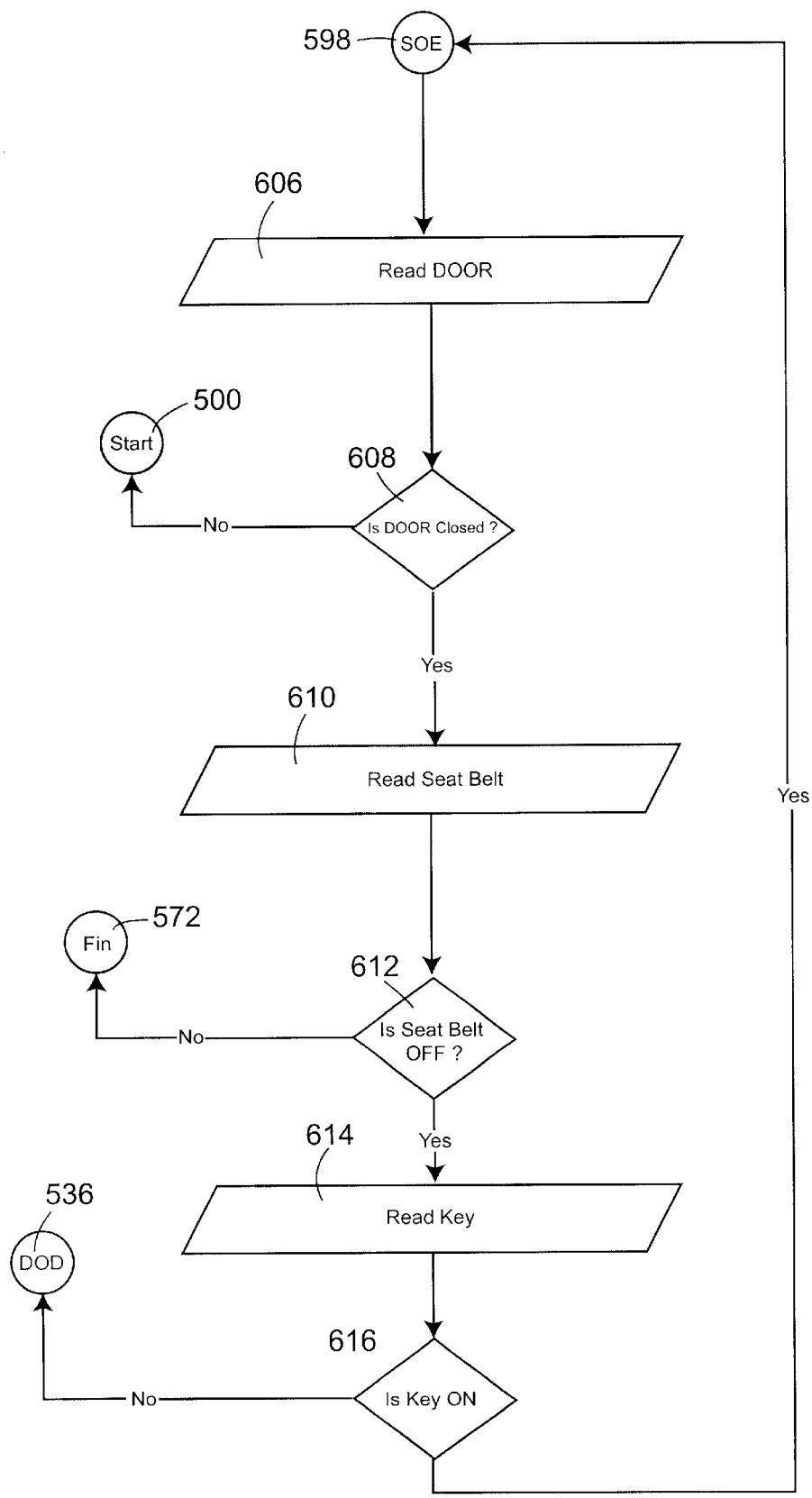

However, if the seat belt is closed (that is the tongue is in the buckle), the ignition key is read in blocks 582 and 584 as shown in FIG. 19f. If the ignition key is off, the buckle presenter is once again moved to an up position in block 586 and then the condition of the door in blocks 588 and 590 is interrogated. If the door remains closed, then in blocks 592 and 594 the controller again interrogates the buckle switch 105 to determine whether or not the tongue is inserted within the buckle (a YES logic condition) or whether or not the tongue has been removed (a NO logic condition). If the tongue has been removed from the buckle, the controller in block 596 moves or ensures that the buckle presenter 500 is in its down condition and the logic continues at intermediate condition 598. If, however, the tongue is in the buckle, the controller again interrogates the status of the ignition key in blocks 600 and 602. If the key is on, the controller commands the buckle presenter 100 to its down position in block 604.

Figure 19G:
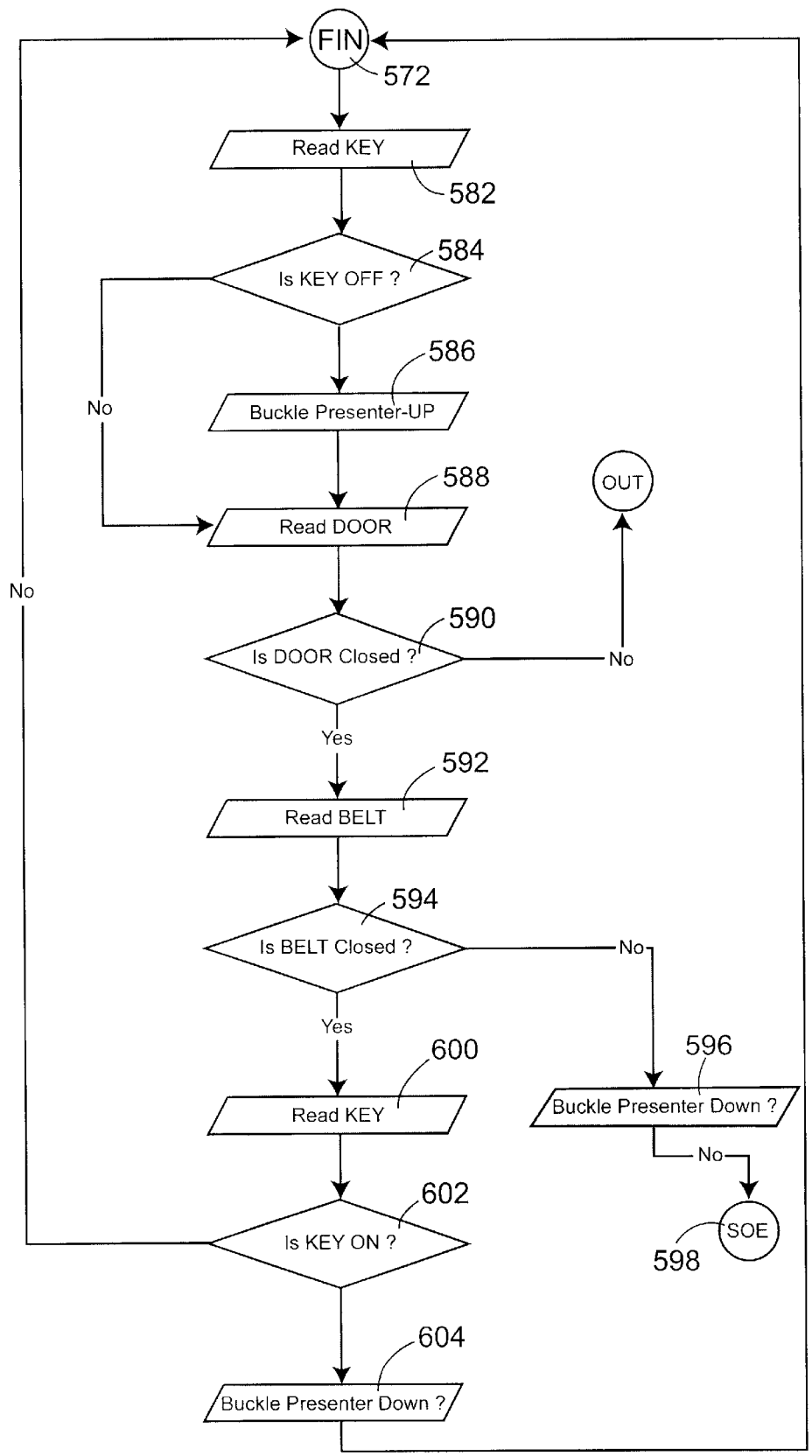

Finally, reference is made to FIG. 19g in which the status of the door is once again interrogated in blocks 606 and 608. If the door is open, the logic reverts to the start block 100.

If, however, the door is closed the status of the seat belt is determined in blocks 610 and 612. If the tongue is still within the seat belt buckle, the process reverts to condition 572. However, if the tongue has been unbuckled from the buckle, the status of the ignition key is once again determined in blocks 614 and 616. If the key is on, the logic reverts to the logic condition 598 and if the key is off, the process reverts to logic condition 536.

Many changes and modifications in the above-described embodiment of the invention can, of course, be carried out without departing from the scope thereof. Accordingly, that scope is intended to be limited only by the scope of the appended claims.

What is claimed is:

1. A method of operating a seat belt system comprising a seat belt buckle and a tongue manually insertable into the buckle and a buckle presenter mechanism for moving the buckle from a stowed condition in which the buckle is located to the side of an occupant to a presented position generally in front of the occupant and a tongue presenter mechanism for moving the tongue from a stowed condition in which the tongue is respectively located at an opposite side of the occupant to a tongue presented position generally in front of the occupant, the method comprising the steps of:
   a) monitoring if an occupant has sat down on a seat cushion;
   b) moving the tongue presenter, and hence the tongue, from its stowed position to its forward or active position;
   c) moving the buckle presenter (100) and buckle from its stowed position to its corresponding forward or active position;
   d) monitoring whether or not the tongue (24) has been locked in the buckle;
   e) moving the buckle presenter, with the tongue locked to the buckle, to the buckle stowed position;
   f) also stowing the tongue presenter and;
   g) deactivating a buckle pretensioner at least until the buckle and tongue have been moved to the buckle stowed position.

2. The method as defined in claim 1 including the steps of:
   h) determining whether or not an adjacent vehicle door has been closed; and
   i) postponing moving either the buckle or tongue presenter to the respective forward or active position until the adjacent vehicle door has been closed.

3. The method as defined in claim 2 including the steps of:
   j) determining if the occupant has subsequently re-opened the adjacent door.

4. The method as defined in claim 2 including the steps of:
   k) determining if the occupant has subsequently re-opened the adjacent door by determining if a change in state of a door switch associated with the adjacent door has occurred.

5. The method as defined in claim 3 including the steps of:
   l) returning the buckle and tongue locked therein to the buckle activated position.

6. The method as defined in claim 2 including the steps of:
   m) monitoring the status of a vehicle engine; and
   n) upon determining the engine has been shut down;
   o) returning the buckle and tongue locked therein to the buckle activated position.

7. A method of operating a seat belt system comprising a seat belt buckle and a tongue manually insertable into the buckle and a buckle presenter mechanism for moving the buckle from a stowed condition in which the buckle is located to the side of an occupant to a presented position generally in front of the occupant and a tongue presenter mechanism for moving the tongue from a stowed condition in which the tongue is respectively located at an opposite side of the occupant to a tongue presented position generally in front of the occupant, the method comprising the steps of:
   a) monitoring if an occupant has sat down on a seat cushion;
   b) moving the tongue presenter, and hence the tongue, from its stowed position to its forward or active position;
   c) moving the buckle presenter (100) and buckle from its stowed position to its corresponding forward or active position;
   d) monitoring whether or not the tongue (24) has been locked in the buckle;
   e) moving the buckle presenter, with the tongue locked to the buckle, to the buckle stowed position; and
   f) delaying the withdrawal of the buckle presenter until the occupant has placed the transmission in gear.

8. The method as defined in claim 7 including the step of:
   g) sensing changes in the state of a vehicle transmission.

9. A method of operating a seat belt system comprising a seat belt buckle and a tongue manually insertable into the buckle and a buckle presenter mechanism for moving the buckle from a stowed condition in which the buckle is located to the side of an occupant to a presented position generally in front of the occupant and a tongue presenter mechanism for moving the tongue from a stowed condition in which the tongue is respectively located at an opposite side of the occupant to a tongue presented position generally in front of the occupant, the method comprising the steps of:
   a) interrogating the state of various control mechanisms including interrogating: a weight sensor (404), a door status sensor (406), an ignition status sensor (400), a web sensor (362), a buckle status sensor (105), and a transmission status sensor (408);
   b) determining if the occupant is properly seated within his or her seat;
   c) if the occupant is properly seated with the door closed then generating control signals to: a) move the buckle presenter from its stowed position to its activated position and b) move the tongue presenter from its stowed position to its activated position;
   d) determining if the occupant has opened the door after being seated and if this situation has occurred before the occupant has inserted the tongue into the buckle, then
   e) generating control signals to cause the tongue and the buckle to move to their respective stowed positions to enable easy egress from the vehicle.

10. The method as defined in claim 9 including the steps of:
    f) determining if the occupant has begun to pull the tongue away from the tongue presenter; and
    g) generating a control signal causing the tongue presenter motor to return to its stowed position in response to the status of the web switch.

11. The method as defined in claim 9 comprising the steps of:
    h) determining if the occupant has pulled the lap belt out sufficiently and latched the tongue into the buckle and if the tongue has been latched to the buckle, in response to a buckle switch signal, causing the buckle presenter to move the buckle, with the tongue latch therein to the buckle stowed position.

12. The method as defined in claim 11 including the steps of:
   i) monitoring the status of the door status sensor to determine an open door condition and subsequently elevating the buckle presenter to its activated position in anticipation of the occupant unbuckling the tongue from the buckle and exiting the vehicle.

13. The method as defined in claim 11 including the steps:
   j) determining if the door is closed by sensing the status of the door switch, without unbuckling the tongue by sensing the state of the buckle switch from the buckle and causing the buckle presenter to return to its stowed position; and, determining if the occupant has unbuckled the tongue from the buckle as sensed by the status of the buckle switch returning the buckle presenter to its stowed position.

14. The method as defined in claim 13 including the steps:
   k) determining if the ignition switch has been turned off by monitoring the state of the ignition switch to see if it has been cycled to its off state and if the buckle presenter is in its stowed position the cycling of the ignition switch causes the buckle presenter to move to its activated position provided the tongue is latched in the buckle as sensed by the status of the buckle switch.

15. The method as defined in claim 13 including the steps of:
   l) determining if the ignition switch has been turned off by monitoring the state of the ignition switch to determine if the switch has been cycled to its off state, and
   m) if the buckle presenter is in its stowed position, then causes the buckle presenter to move the buckle presenter to its activated position, if it is also determined the tongue is latched in the buckle.

\* \* \* \* \*